(12) United States Patent  
Fujii

(10) Patent No.: US 7,760,275 B2  
(45) Date of Patent: Jul. 20, 2010

(54) PHASE DIFFERENCE COMPENSATING ELEMENT, LIQUID CRYSTAL DEVICE, AND PROJECTION TYPE DISPLAY APPARATUS

(75) Inventor: Takamichi Fujii, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 366 days.

(21) Appl. No.: 11/995,358

(22) PCT Filed: Jul. 7, 2006

(86) PCT No.: PCT/JP2006/314012

§ 371 (c)(1),
(2), (4) Date: Jan. 11, 2008

(87) PCT Pub. No.: WO2007/007858

PCT Pub. Date: Jan. 18, 2007

(65) Prior Publication Data

US 2009/0225241 A1     Sep. 10, 2009

(30) Foreign Application Priority Data

Jul. 11, 2005   (JP) ............................ 2005-202044

(51) Int. Cl.
*G02F 1/1335* (2006.01)
(52) U.S. Cl. .......................................................... 349/5
(58) Field of Classification Search ................ None
See application file for complete search history.

(56) References Cited

U.S. PATENT DOCUMENTS

| 5,184,237 A | 2/1993 | Iimura et al. |
| 5,504,603 A | 4/1996 | Winker et al. |
| 5,932,354 A | 8/1999 | Takeda et al. |
| 2005/0168662 A1 | 8/2005 | Nakagawa |
| 2006/0092358 A1* | 5/2006 | Fujii et al. ................ 349/119 |
| 2007/0146596 A1* | 6/2007 | Fujii ........................ 349/117 |

FOREIGN PATENT DOCUMENTS

| EP | 0 676 660 A1 | 10/1995 |
| EP | 1523857 A1 | 4/2005 |
| JP | 10-081955 A | 3/1998 |
| JP | 11-023840 A | 1/1999 |
| JP | 2004-102200 A | 4/2004 |
| JP | 2004-240181 A | 8/2004 |

* cited by examiner

*Primary Examiner*—Sung H Pak
(74) *Attorney, Agent, or Firm*—Sughrue Mion, PLLC

(57) ABSTRACT

A phase difference compensation element comprises at least one birefringent laminate, which contains a light transmissive base material and "a" number, where a≧2, of inorganic oblique incidence vacuum deposited films varying in direction of oblique evaporation and having been laminated on a surface of the light transmissive base material. The birefringent laminate satisfies the conditions represented by Formula (i) and Formula (ii):

$$Re(1) < Re(a) \quad (i)$$

$$Re(b-1) \leq Re(b) \quad (ii)$$

where b is an arbitrary integer satisfying the condition $2 \leq b \leq a$
wherein Re(i) represents the retardation value d·Δn of the inorganic oblique incidence vacuum deposited film which has been formed at an i-th stage of film formation among the stages of forming the "a" number of the inorganic oblique incidence vacuum deposited films, respectively, where $1 \leq i \leq a$, d represents the film thickness, and Δn represents the birefringent index.

12 Claims, 4 Drawing Sheets

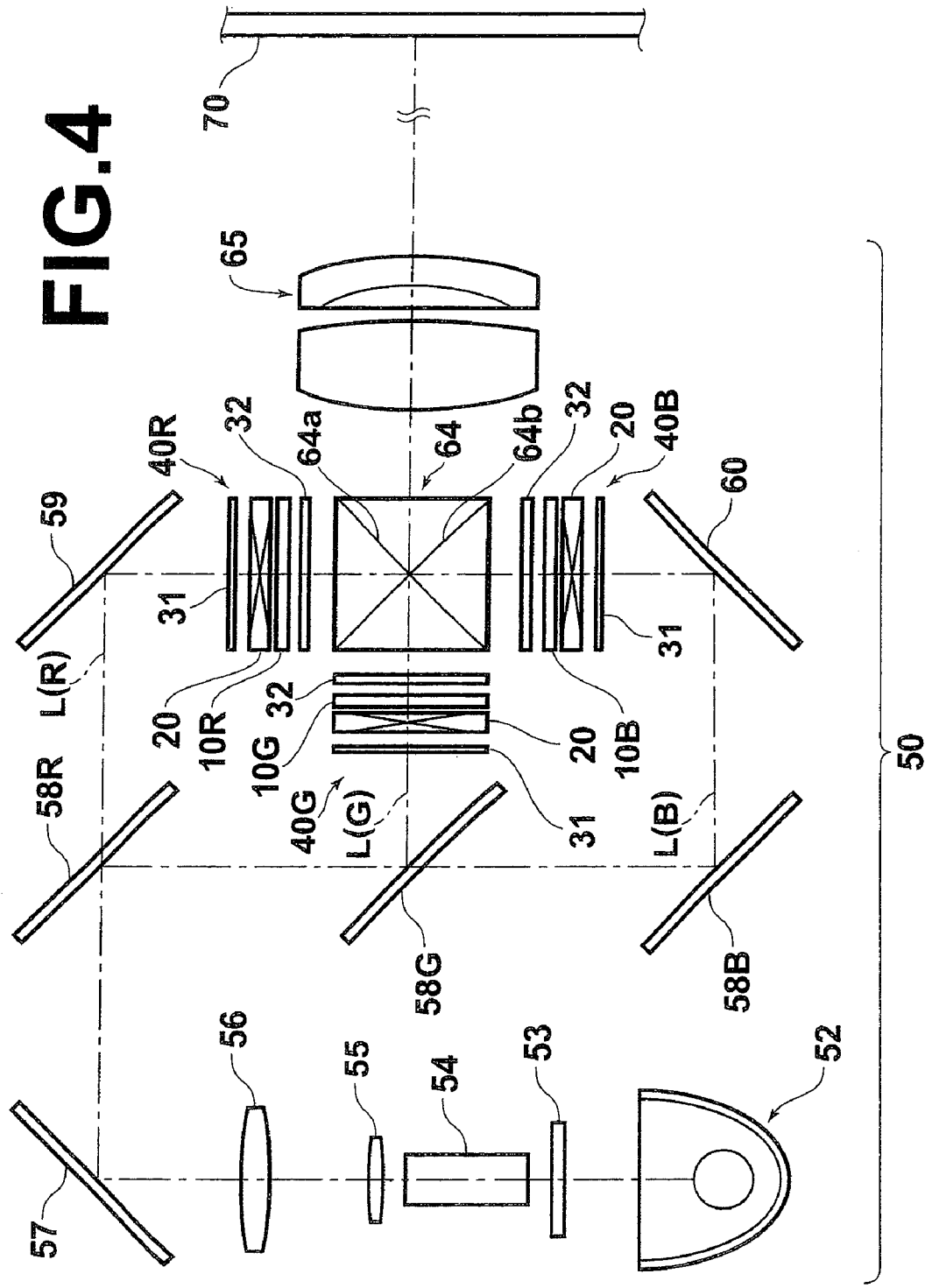

PHASE DIFFERENCE COMPENSATING ELEMENT, LIQUID CRYSTAL DEVICE, AND PROJECTION TYPE DISPLAY APPARATUS

TECHNICAL FIELD

This invention relates to a phase difference compensation element for use in a liquid crystal device, or the like. This invention also relates to a liquid crystal device provided with the phase difference compensation element. This invention further relates to a projection type display apparatus provided with the phase difference compensation element.

BACKGROUND ART

There have heretofore been known longitudinal electric field types of liquid crystal devices, which are provided with a liquid crystal cell as a basic constitution. The liquid crystal cell comprises a pair of base plates with electrodes, which base plates with electrodes are located so as to stand facing each other, and a liquid crystal layer supported between the pair of the base plates with electrodes. With the longitudinal electric field types of the liquid crystal devices, orientation of liquid crystal molecules contained in the liquid crystal layer is altered between the time free from voltage application across the liquid crystal layer and the time of voltage application across the liquid crystal layer, and displaying operations, or the like, are thereby performed. With the liquid crystal devices described above, an orientating film is located on each of inside surfaces of the pair of the base plates with electrodes, and the orientation (i.e., a pre-tilt angle and a twist angle) of the liquid crystal molecules at the time free from voltage application is regulated by the orientating films. Also, at the time of voltage application, the orientation of the liquid crystal molecules is altered along the electric field direction (in the cases of the longitudinal electric field types of the liquid crystal devices, along the direction normal to the orientating films). In a twisted nematic (TN) mode, the twist angle at the time free from voltage application is equal to 90°.

In the cases of the liquid crystal devices described above, a polarizer is located on the side outward from the liquid crystal cell, and light is irradiated via the polarizer to the liquid crystal layer. The light having entered into the liquid crystal layer is radiated out via the polarizer to the side of a person, who views the displayed image.

In the cases of transmission types of liquid crystal devices, a pair of polarizers are located respectively on opposite sides outward from a combination of a pair of base plates constituting a liquid crystal cell (i.e., on the light incidence side and the light radiating side). The combination of the pair of the polarizers are selected such that the light may not be radiated out to the side of the person, who views the displayed image, in an orientated state of the liquid crystal molecules at the time free from voltage application or at the time of voltage application. Specifically, in the TN mode, in cases where the pair of the polarizers are located in accordance with a crossed Nicols arrangement, in which the axes of polarization of the pair of the polarizers are normal to each other, the operation mode is set in a normally white mode, in which the liquid crystal devices are set in a bright state at the time free from voltage application. Also, in cases where the pair of the polarizers are located in accordance with a parallel Nicols arrangement, in which the axes of polarization of the pair of the polarizers are parallel with each other, the operation mode is set in a normally black mode, in which the liquid crystal devices are set in a bright state at the time of voltage application.

Besides the polarizers, the liquid crystal devices are provided with phase difference compensation elements. Functions of the phase difference compensation elements will be described hereinbelow by taking the normally white TN mode, in which the liquid crystal devices are set in a dark state at the time of voltage application, as an example.

In the normally white TN mode, in cases where the liquid crystal devices are not provided with the phase difference compensation elements, at the time of voltage application, at which the liquid crystal molecules are set in an approximately normal orientated state (i.e., in an approximately uniaxial orientated state), the liquid crystal layer exhibits little birefringent characteristics with respect to normal incident light and directly transmits linearly polarized light, which has impinged upon the liquid crystal layer from the direction normal to the liquid crystal layer. However, in such cases, the liquid crystal layer exhibits the birefringent characteristics with respect to oblique incident light, and therefore the linearly polarized light, which has impinged upon the liquid crystal layer from an oblique direction, is converted into elliptically polarized light, and the elliptically polarized light having thus been produced is radiated out from the liquid crystal layer. Part of the elliptically polarized light, which has thus been radiated out from the liquid crystal layer, passes through the polarizer, which is located on the light radiating side of the liquid crystal device. As a result, the degree of darkness becomes low. Specifically, the contrast becomes low. Also, in cases where the incidence angle of the oblique incident light upon the liquid crystal layer becomes large, the birefringent characteristics become high, and the degree of lowering of the contrast becomes high. Therefore, the angle of field, at which a high contrast is capable of being obtained, becomes narrow. Accordingly, phase difference compensation elements are utilized, which have a phase difference compensating function (A) for compensating for a phase difference of the aforesaid elliptically polarized light occurring due to the birefringence of the oblique incident light, and for restoring the elliptically polarized light to the linearly polarized light.

Further, in the normally white TN mode, at the time of voltage application, the liquid crystal molecules contained in the liquid crystal layer are set in the approximately normal orientated state as a whole. However, the liquid crystal molecules, which are located in the vicinity of each of the orientating films, are affected by the orientating film. Therefore, it often occurs that the liquid crystal molecules, which are located in the vicinity of each of the orientating films, are set in a hybrid orientated state, in which the direction of the orientation of the liquid crystal molecules is altered successively from the approximately normal direction to the direction of the orientation of each of the orientating films. Accordingly, the phase difference compensation elements should preferably have, besides the aforesaid phase difference compensating function (A), a phase difference compensating function (B) with respect to the birefringence due to the liquid crystal molecules having been set in the hybrid orientated state.

Recently, phase difference compensation elements constituted of inorganic materials have been proposed. The phase difference compensation elements constituted of the inorganic materials have a high heat resistance, a high light resistance, good chemical stability, and the like, and are appropriate for use in, for example, liquid crystal devices to be loaded in projection type display apparatuses, such as projectors. As the inorganic phase difference compensation elements, there have been proposed (1) a phase difference compensation element provided with a multi-layer thin film comprising a high refractive index thin film and a low refractive index thin film, which are laminated alternately with thicknesses smaller than light wavelengths, (as disclosed in, for example, Japanese Unexamined Patent Publication No. 2004-102200), and (2) a phase difference compensation element provided with a plurality of inorganic oblique incidence vacuum deposited films varying in direction of oblique evaporation (as disclosed in, for example, Japanese Unexamined Patent Publication No. 10 (1998)-081955.

With the phase difference compensation element (1) disclosed in, for example, Japanese Unexamined Patent Publication No. 2004-102200), the multi-layer thin film exhibits negative uniaxial birefringent characteristics and has the so-called negative C-plate characteristics. With the phase difference compensation element (1) disclosed in, for example, Japanese Unexamined Patent Publication No. 2004-102200), the phase difference compensating function (A) with respect to the birefringence of the oblique incident light is good, but the phase difference compensating function (B) with respect to the birefringence due to the liquid crystal molecules having been set in the hybrid orientated state is not sufficient.

The phase difference compensation element (2) disclosed in, for example, Japanese Unexamined Patent Publication No. 10(1998)-081955 has the laminate structure of the plurality of the inorganic oblique incidence vacuum deposited films having different birefringent characteristics. Therefore, it may be considered that, with the phase difference compensation element (2) disclosed in, for example, Japanese Unexamined Patent Publication No. 10 (1998)-081955, the phase difference compensating function (B) with respect to the birefringence due to the liquid crystal molecules having been set in the hybrid orientated state will be capable of being obtained. However, each of the inorganic oblique incidence vacuum deposited films constituted of a plurality of pillar-shaped crystals is apt to have an uneven surface. In cases where the plurality of the inorganic oblique incidence vacuum deposited films are overlaid one upon another, vacuum evaporation failures, such as agglomeration of the pillar-shaped crystals, are apt to occur with an inorganic oblique incidence vacuum deposited film, which is formed by later vacuum evaporation processing. Therefore, it is not always possible to achieve reliable formation of the films having desired optical characteristics. Also, if the agglomeration of the pillar-shaped crystals, or the like, occurs, there will be the risk that the film will suffer from cloudiness due to a light scattering phenomenon at the part at which the agglomeration has occurred, and that the optical characteristics, such as a transmittance, will become bad. In, for example, Japanese Unexamined Patent Publication No. 10 (1998)-081955, it is described that, with formation of frontal incidence vacuum deposited films located among the plurality of the inorganic oblique incidence vacuum deposited films, the occurrence of the vacuum evaporation failures of films formed by later vacuum evaporation processing may be suppressed, and the occurrence of cloudiness may thereby be suppressed. However, the formation of the frontal incidence vacuum deposited films located among the plurality of the inorganic oblique incidence vacuum deposited films is not appropriate from the view point of the number of production steps, the production cost, and the like. Also, in cases where unnecessary frontal incidence vacuum deposited films are located among the plurality of the inorganic oblique incidence vacuum deposited films, there will be the risk that the optical characteristics, such as the transmittance, will become bad.

In view of the above circumstances, the primary object of the present invention is to provide an inorganic phase difference compensation element, which has a good phase difference compensating function with respect to birefringent characteristics of liquid crystal molecules having been set in a hybrid orientated state, and which has good optical characteristics, such as phase difference compensating functions and a transmittance, good production easiness, and good production stability.

An other object of the present invention is to provide a liquid crystal device, in which the phase difference compensation element is employed.

A further object of the present invention is to provide a projection type display apparatus, in which the phase difference compensation element is employed.

The present invention particularly aims at furnishing the inorganic phase difference compensation element having the characteristics described above. However, the present invention is also applicable to an organic phase difference compensation element.

DISCLOSURE OF INVENTION

The present invention provides a first phase difference compensation element, comprising at least one birefringent laminate, which contains a light transmissive base material and "a" number, where $a \geq 2$, of inorganic oblique incidence vacuum deposited films varying in direction of oblique evaporation, the inorganic oblique incidence vacuum deposited films having been laminated on a surface of the light transmissive base material, the birefringent laminate satisfying the conditions represented by Formula (i) and Formula (ii):

$$Re(1) < Re(a) \quad \text{(i)}$$

$$Re(b-1) \leq Re(b) \quad \text{(ii)}$$

where b is an arbitrary integer
satisfying the condition $2 \leq b \leq a$ wherein Re(i) represents the retardation value $d \cdot \Delta n$ of the inorganic oblique incidence vacuum deposited film which has been formed at an i-th stage of film formation among the stages of forming the "a" number of the inorganic oblique incidence vacuum deposited films, respectively, where $1 \leq i \leq a$, d represents the film thickness, and $\Delta n$ represents the birefringent index.

The term "varying in direction of oblique evaporation" as used herein means that an azimuthal angle $\alpha$ of the direction of oblique evaporation and/or a polar angle $\beta$ of the direction of oblique evaporation varies for different inorganic oblique incidence vacuum deposited films. (The azimuthal angle $\alpha$ and the polar angle $\beta$ will later be described in detail with reference to FIG. 3.) An arbitrary x axis and an arbitrary y axes, which intersect orthogonally with each other, may be set on a plane of vacuum evaporation. Also, an axis, which is normal to the plane of vacuum evaporation, may be taken as a z axis. In such cases, the azimuthal angle $\alpha$ of the direction of oblique evaporation represents the angle made between an xy direction vector of the direction of oblique evaporation and the x axis. Also, the polar angle $\beta$ represents the angle made between an xyz direction vector of the direction of oblique evaporation and the z axis.

The retardation values Re(i.e., Re(1) to Re(a), Re(0) described later, and Re(LC) described later) are herein calculated under the conditions such that the wavelength distribution range of incident light are kept the same. Also, unless otherwise specified, the term "film thickness" as used herein means the physical film thickness.

The present invention also provides a second phase difference compensation element for use in combination with a liquid crystal cell, which is provided with a pair of base plates located so as to stand facing each other, and a liquid crystal layer supported between the pair of the base plates, the pair of the base plates being provided with electrodes for applying a voltage across the liquid crystal layer, the phase difference compensation element comprising at least one birefringent laminate, which contains a light transmissive base material, a first phase difference compensating layer for performing phase difference compensation with respect to birefringent characteristics of liquid crystal molecules having been set in an approximately uniaxial orientated state, and a second phase difference compensating layer for performing phase difference compensation with respect to birefringent characteristics of liquid crystal molecules having been set in a hybrid orientated state, the first phase difference compensating layer and the second phase difference compensating layer having been laminated on a surface of the light transmissive base material, the second phase difference compensating layer of the birefringent laminate having a laminate structure constituted of "a" number, where a≧2, of birefringent films, the second phase difference compensating layer satisfying the conditions represented by Formula (i) and Formula (ii):

$$Re(1) < Re(a) \quad (i)$$

$$Re(b-1) \leq Re(b) \quad (ii)$$

where b is an arbitrary integer
satisfying the condition 2≦b≦a wherein Re(i) represents the retardation value d·Δn of the birefringent film which has been formed at an i-th stage of film formation among the stages of forming the "a" number of the birefringent films, respectively, where 1≦i≦a, d represents the film thickness, and Δn represents the birefringent index.

The light transmissive base material of the second phase difference compensation element in accordance with the present invention and the base plate of the liquid crystal cell, which base plate is located on the side corresponding to the second phase difference compensation element in accordance with the present invention, may be constituted as two independent members. Alternatively, the base plate of the liquid crystal cell, which base plate is located on the side corresponding to the second phase difference compensation element in accordance with the present invention, may be utilized as the light transmissive base material of the second phase difference compensation element in accordance with the present invention.

The second phase difference compensation element in accordance with the present invention is applicable to both the inorganic phase difference compensation element and the organic phase difference compensation element.

The second phase difference compensation element in accordance with the present invention is applicable particularly to the inorganic phase difference compensation element. Specifically, the second phase difference compensation element in accordance with the present invention should preferably be modified such that the first phase difference compensating layer is constituted of an inorganic material, and the second phase difference compensating layer is constituted of "a" number of inorganic oblique incidence vacuum deposited films varying in direction of oblique evaporation.

In cases where the second phase difference compensation element in accordance with the present invention is constituted as the inorganic phase difference compensation element, the second phase difference compensation element in accordance with the present invention should preferably be modified such that the liquid crystal cell is provided with orientating films for regulating the orientation of the liquid crystal molecules, which are contained in the liquid crystal layer, at the time free from voltage application, each of the orientating films being located on the side of one of inside surfaces of the pair of the base plates of the liquid crystal cell, an xyz coordinate system is set with respect to the orientating film of the liquid crystal cell, which orientating film is located on the side close to the phase difference compensation element when the phase difference compensation element is combined with the liquid crystal cell, the xyz coordinate system being defined by an x axis representing the orientation axis of the orientating film, a y axis representing the axis intersecting orthogonally with the x axis in a plane of the orientating film, and a z axis representing the axis, which is normal to the plane of the orientating film, each of the "a" number of the inorganic oblique incidence vacuum deposited films constituting the second phase difference compensating layer is set such that an xy direction vector of the direction of oblique evaporation has a vector orientation different from the direction of the x axis, and x and y coordinate components (Ax, Ay) of a composite vector, which has been composed from optic axis vectors of the "a" number of the inorganic oblique incidence vacuum deposited films constituting the second phase difference compensating layer, satisfy the conditions represented by Formula (iii):

$$0 \text{ nm} \leq |Ax| \leq 100 \text{ nm}, 50 \text{ nm} \leq |Ay| \leq 200 \text{ nm} \quad (iii)$$

each of the optic axis vectors of the "a" number of the inorganic oblique incidence vacuum deposited films being calculated with Formula (I):

$$P_i(x,y,z) = (Re(i) \times \cos \alpha_i \times \sin \beta_i, Re(i) \times \sin \alpha_i \times \sin \beta_i, Re(i) \times \cos \beta_i) \quad (I)$$

wherein $P_i$ represents the optic axis vector of the inorganic oblique incidence vacuum deposited film which has been formed at the i-th stage of film formation among the stages of forming the "a" number of the inorganic oblique incidence vacuum deposited films, respectively, where 1≦i≦a, $\alpha_i$ represents the azimuthal angle of the direction of oblique evaporation of the inorganic oblique incidence vacuum deposited film which has been formed at the i-th stage of film formation among the stages of forming the "a" number of the inorganic oblique incidence vacuum deposited films, respectively, and $\beta_i$ represents the polar angle of the direction of oblique evaporation of the inorganic oblique incidence vacuum deposited film which has been formed at the i-th stage of film formation among the stages of forming the "a" number of the inorganic oblique incidence vacuum deposited films, respectively, the azimuthal angle being the angle made between the xy direction vector of the direction of oblique evaporation and the x axis, the polar angle being the angle made between the xyz direction vector of the direction of oblique evaporation and the z axis.

The optic axis vector of the inorganic oblique incidence vacuum deposited film (i.e., the birefringent characteristics-free optic axis of the inorganic oblique incidence vacuum deposited film) approximately coincides with the xyz direction vector of the direction of oblique evaporation. The orientation axis of the orientating film is the axis which regulates the major axis directions of the liquid crystal molecules. In the cases of a rubbing orientating film, the orientation axis of the orientating film corresponds to the rubbing direction.

In cases where the second phase difference compensation element in accordance with the present invention is constituted as the inorganic phase difference compensation element having the constitution described above, the second phase difference compensation element in accordance with the present invention should preferably be modified such that the phase difference compensation element satisfies the condition represented by Formula (iv):

$$-2 \times Re(LC) \leq Re(0) \leq -0.5 \times Re(LC) \quad \text{(iv)}$$

wherein Re(0) represents the retardation value of the first phase difference compensating layer, and Re(LC) represents the retardation value of the liquid crystal layer at the time of application of a maximum voltage.

Also, the second phase difference compensation element in accordance with the present invention should preferably be modified such that the first phase difference compensating layer has a laminate structure, in which at least one high refractive index film having a comparatively high refractive index and at least one low refractive index film having a comparatively low refractive index have been laminated alternately, and an optical film thickness of each of the high refractive index film and the low refractive index film, which optical film thickness is the product of a physical film thickness and the refractive index, falls within the range of 1/100 of a reference wavelength of light incident upon the phase difference compensation element to 1/5 of the reference wavelength of the light incident upon the phase difference compensation element.

The term "reference wavelength" as used herein means the central wavelength of the incident light impinging upon the phase difference compensation element. The reference wavelength may vary in accordance with a light source. In cases where the incident light is red light, the reference wavelength may be equal to, for example, 700 nm. In cases where the incident light is green light, the reference wavelength may be equal to, for example, 546 nm. In cases where the incident light is blue light, the reference wavelength may be equal to, for example, 435 nm.

Each of the first and second phase difference compensation elements in accordance with the present invention should preferably be modified such that an anti-reflection layer is formed on the outermost surface on a light incidence side of the phase difference compensation element and/or the outermost surface on a light radiating side of the phase difference compensation element.

The present invention further provides a liquid crystal device, comprising:

a liquid crystal cell, which is provided with a pair of base plates located so as to stand facing each other, a liquid crystal layer supported between the pair of the base plates, and orientating films for regulating the orientation of liquid crystal molecules contained in the liquid crystal layer at the time free from voltage application, each of the orientating films being located on one of the pair of the base plates, the pair of the base plates being provided with electrodes for applying a voltage across the liquid crystal layer, and the first or second phase difference compensation element in accordance with the present invention, which is located so as to stand facing the liquid crystal cell.

The present invention still further provides a projection type display apparatus, comprising:

a light source, at least one light modulating device for modulating light radiated out from the light source, and a projecting optical system for projecting the light, which has been modulated by the light modulating device, the light modulating device being constituted of the liquid crystal device in accordance with the present invention.

The first phase difference compensation element in accordance with the present invention comprises the laminate structure containing the "a" number, where $a \geq 2$, of the inorganic oblique incidence vacuum deposited films varying in direction of oblique evaporation. Therefore, the first phase difference compensation element in accordance with the present invention has a good phase difference compensating function with respect to the birefringent characteristics of the liquid crystal molecules having been set in the hybrid orientated state.

Also, the first phase difference compensation element in accordance with the present invention satisfies the conditions represented by Formula (i) and Formula (ii):

$$Re(1) < Re(a) \quad \text{(i)}$$

$$Re(b-1) \leq Re(b) \quad \text{(ii)}$$

where b is an arbitrary integer satisfying the condition $2 \leq b \leq a$ wherein Re(i) represents the retardation value $d \cdot \Delta n$ of the inorganic oblique incidence vacuum deposited film which has been formed at the i-th stage of film formation among the stages of forming the "a" number of the inorganic oblique incidence vacuum deposited films, respectively, where $1 \leq i \leq a$, d represents the film thickness, and $\Delta n$ represents the birefringent index.

In cases where the retardation value Re becomes large, the inorganic oblique incidence vacuum deposited film is apt to have an uneven surface. With the first phase difference compensation element in accordance with the present invention, the plurality of the inorganic oblique incidence vacuum deposited films are formed with the vacuum evaporation in the order of the increasing retardation value Re. Therefore, unnecessary films need not be formed among the plurality of the inorganic oblique incidence vacuum deposited films, and the occurrence of vacuum evaporation failures of the inorganic oblique incidence vacuum deposited films, which are formed by later vacuum evaporation processing, is capable of being suppressed.

The second phase difference compensation element in accordance with the present invention is constituted as the phase difference compensation element for use in the liquid crystal device. The second phase difference compensation element in accordance with the present invention has the laminate structure, which contains the first phase difference compensating layer for performing the phase difference compensation with respect to the birefringent characteristics of the liquid crystal molecules having been set in the approximately uniaxial orientated state, and the second phase difference compensating layer for performing the phase difference compensation with respect to the birefringent characteristics of the liquid crystal molecules having been set in the hybrid orientated state.

The second phase difference compensation element in accordance with the present invention comprises the second phase difference compensating layer described above. Therefore, the second phase difference compensation element in accordance with the present invention has a good phase difference compensating function with respect to the birefringent characteristics of the liquid crystal molecules having been set in the hybrid orientated state.

Also, with the second phase difference compensation element in accordance with the present invention, the second phase difference compensating layer of the birefringent laminate has the laminate structure constituted of the "a" number, where a≧2, of the birefringent films, and the second phase difference compensating layer satisfies the conditions represented by Formula (i) and Formula (ii):

$$Re(1) < Re(a) \quad \text{(i)}$$

$$Re(b-1) \leqq Re(b) \quad \text{(ii)}$$

where b is an arbitrary integer
satisfying the condition 2≦b≦a wherein Re(i) represents the retardation value d·Δn of the birefringent film which has been formed at the i-th stage of film formation among the stages of forming the "a" number of the birefringent films, respectively, where 1≦i≦a, d represents the film thickness, and Δn represents the birefringent index.

Therefore, as in the cases of the first phase difference compensation element in accordance with the present invention, with the second phase difference compensation element in accordance with the present invention, unnecessary films need not be formed among the plurality of the birefringent films, and the occurrence of film formation failures of the birefringent films, which are formed by later film formation processing, is capable of being suppressed.

With each of the first and second phase difference compensation elements in accordance with the present invention, it is possible to provide an inorganic phase difference compensation element, which has a good phase difference compensating function with respect to the birefringent characteristics of the liquid crystal molecules having been set in the hybrid orientated state, and which has good optical characteristics, such as phase difference compensating functions and a transmittance, good production easiness, and good production stability. Also, with the second phase difference compensation element in accordance with the present invention, it is also possible to provide an organic phase difference compensation element having the same characteristics as those described above.

BRIEF DESCRIPTION OF THE DRAWINGS

FIG. 4 is an explanatory view showing an embodiment of the projection type display apparatus in accordance with the present invention.

BEST MODE FOR CARRYING OUT THE INVENTION

The present invention will hereinbelow be described in further detail with reference to the accompanying drawings.

[Phase Difference Compensation Element and Liquid Crystal Device]

An embodiment of the phase difference compensation element in accordance with the present invention and an embodiment of the liquid crystal device in accordance with the present invention will be described hereinbelow. The embodiment of the liquid crystal device in accordance with the present invention will be described by taking a TN mode transmission type of liquid crystal device operating in a normally white mode, in which the liquid crystal device is set in a bright state at the time free from voltage application, as an example. By way of example, the embodiment of the liquid crystal device in accordance with the present invention is constituted as the liquid crystal device, which is to be loaded on a projection type display apparatus and utilized as a light modulating device for modulating color light (red light, green light, or blue light) having wavelengths falling within a specific wavelength distribution range.

Figure 1:
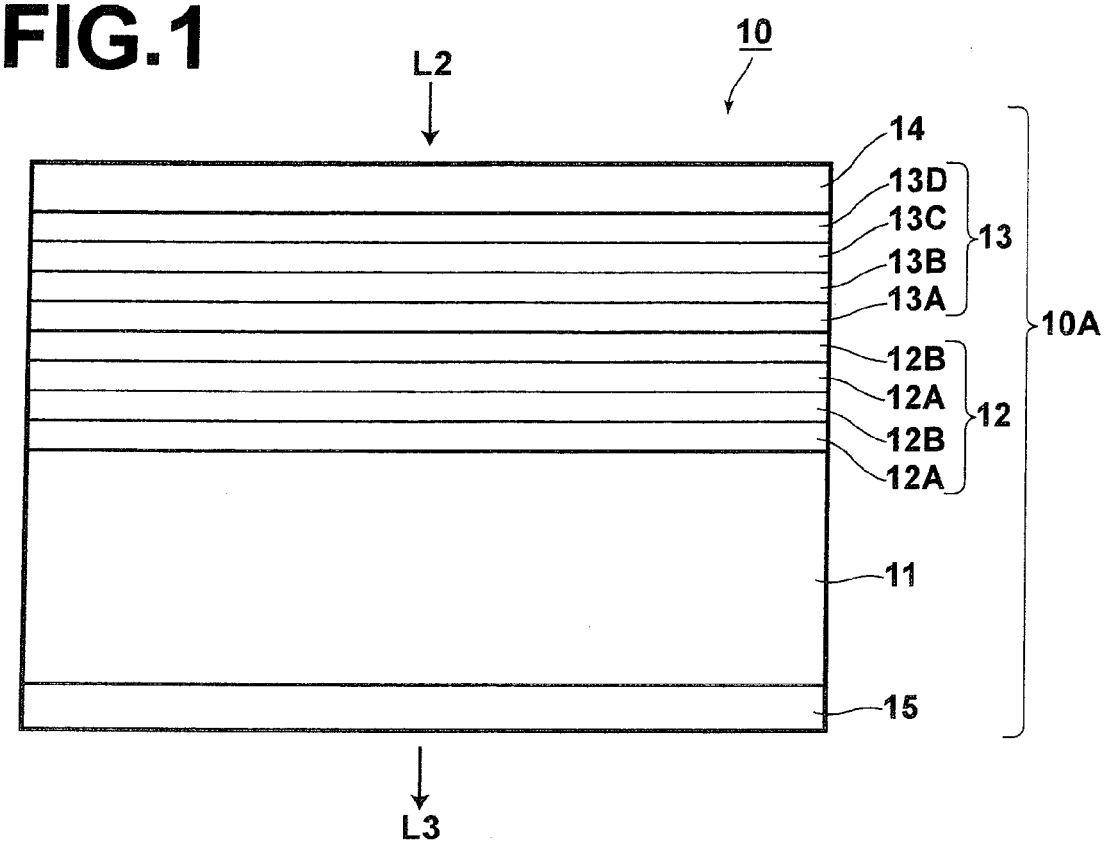
FIG. 1 is a sectional view showing an embodiment of the phase difference compensation element in accordance with the present invention, the view being taken in a thickness direction of the phase difference compensation element.
Figure 2:
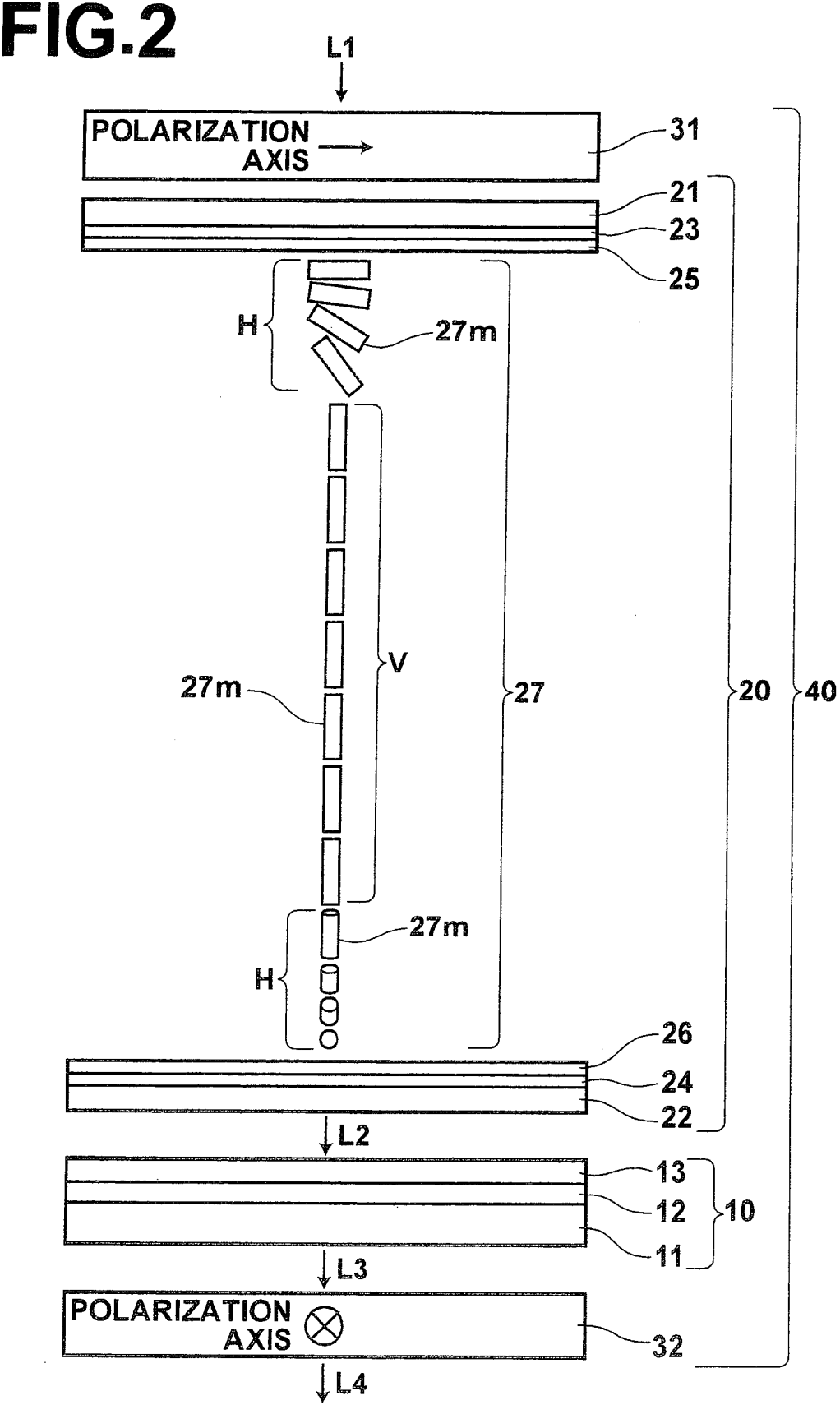
FIG. 2 is an explanatory view showing a cross-sectional structure of an embodiment of the liquid crystal device in accordance with the present invention.

FIG. 1 is a sectional view showing an embodiment of the phase difference compensation element in accordance with the present invention, the view being taken in a thickness direction of the phase difference compensation element. FIG. 2 is an explanatory view showing a cross-sectional structure of an embodiment of the liquid crystal device in accordance with the present invention, the view being taken in the thickness direction of the phase difference compensation element. (In FIG. 1 and FIG. 2, hatching is omitted.) In each of FIG. 1 and FIG. 2, the top side is the light incidence side, and the bottom side is the light radiating side. In FIG. 1 and FIG. 2, the light, which is radiated out from a light source and impinges upon a first polarizer 31, is represented by L1. The light, which is radiated out from a liquid crystal cell 20 and impinges upon a phase difference compensating element 10, is represented by L2. Also, the light, which is radiated out from the phase difference compensation element 10 and impinges upon a second polarizer 32, is represented by L3. Further, the light, which is radiated out from the second polarizer 32, is represented by L4.

As illustrated in FIG. 1, this embodiment of the phase difference compensation element 10 is constituted of one birefringent laminate 10A. The birefringent laminate 10A contains a light transmissive base material 11, a first phase difference compensating layer 12 for performing phase difference compensation with respect to birefringent characteristics of liquid crystal molecules having been set in an approximately uniaxial orientated state, and a second phase difference compensating layer 13 for performing phase difference compensation with respect to birefringent characteristics of liquid crystal molecules having been set in a hybrid orientated state. The first phase difference compensating layer 12 and the second phase difference compensating layer 13 are laminated on a light incidence side surface of the light transmissive base material 11. The birefringent laminate 10A of the phase difference compensation element 10 also contains an anti-reflection layer 14, which is formed on the light incidence side surface of the second phase difference compensating layer 13 (i.e., the outermost surface on the light incidence side of the phase difference compensation element 10), and an anti-reflection layer 15, which is formed on the light radiating side surface of the light transmissive base material 11 (i.e., the outermost surface on the light radiating side of the phase difference compensation element 10).

As illustrated in FIG. 2, this embodiment of the phase difference compensation element 10 is adapted for use in a TN mode transmission type of liquid crystal device 40 operating in the normally white mode, in which the liquid crystal device is set in the bright state at the time free from voltage application.

The transmission type of the liquid crystal device 40 comprises the liquid crystal cell 20 as a basic constitution. The liquid crystal cell 20 is provided with a pair of a base plate 21 and a base plate 22, which are located so as to stand facing each other, and a liquid crystal layer 27 supported between the pair of the base plate 21 and the base plate 22. (The base plate 21 and the base plate 22 may be constituted of glass base plates, or the like.) In the constitution of the transmission type of the liquid crystal device 40, the base plate 21 acts as the base plate on the light incidence side, and the base plate 22 acts as the base plate on the light radiating side. An electrode 23 and an orientating film 25 are laminated on the inside surface of the base plate 21. Also, an electrode 24 an orientating film 26 are laminated on the inside surface of the base plate 22. Since the liquid crystal device 40 is of the TN mode, the orientation axis of the orientating film 25 and the orientation axis of the orientating film 26 are normal to each other. In the cases of FIG. 2, the orientation axis of the orientating film 25 extends in the direction parallel with the plane of the sheet of FIG. 2, and the orientation axis of the orientating film 26 extends in the direction normal to the plane of the sheet of FIG. 2.

The liquid crystal device 40 may have a constitution of a passive matrix type of actuation system or an active matrix type of actuation system. The pattern of the electrode 23 and the pattern of the electrode 24 are designed in accordance with the actuation system. For example, in the cases of the active matrix type of the actuation system, one of the electrode 23 and the electrode 24 is constituted of a plurality of pixel electrodes, and the other is constituted of one common electrode.

The first polarizer 31 is located so as to stand facing the light incidence side surface of the liquid crystal cell 20 (i.e., the outside surface of the base plate 21). Also, the phase difference compensation element 10 and the second polarizer 32 are located so as to stand facing the light radiating side surface of the liquid crystal cell 20 (i.e., the outside surface of the base plate 22). The first polarizer 31, the liquid crystal cell 20, the phase difference compensation element 10, and the second polarizer 32 should preferably be bonded with one another. Alternatively, the first polarizer 31, the liquid crystal cell 20, the phase difference compensation element 10, and the second polarizer 32 may be disposed at fine spacings from one another.

The light L1, which has been radiated out from the light source, passes through the first polarizer 31 and impinges upon the liquid crystal cell 20. The light L2, which has been radiated out from the liquid crystal cell 20, impinges upon the phase difference compensation element 10. The light L3, which has been radiated out from the phase difference compensation element 10, impinges upon the second polarizer 32. Also, the light L4, which has been radiated out from the second polarizer 32, is irradiated to the side of the person, who views the displayed image.

In the normally white mode, the first polarizer 31 and the second polarizer 32 are located in the crossed Nicols arrangement, such that the polarization axis of the first polarizer 31 and the polarization axis of the second polarizer 32 may be normal to each other. In this embodiment, the liquid crystal device 40 is designed such that the polarization axis of the first polarizer 31 and the orientation axis of the orientating film 25 may coincide with each other, and such that the polarization axis of the second polarizer 32 and the orientation axis of the orientating film 26 may coincide with each other.

At the time free from voltage application across the liquid crystal layer 27, liquid crystal molecules $27m$, $27m$, . . . contained in the liquid crystal layer 27 are subjected to regulation effects of the orientating film 25 and the orientating film 26 and are thus set in a twist orientated state (twist angle: 90°). At the time of voltage application across the liquid crystal layer 27, the orientation of the liquid crystal molecules $27m$, $27m$, . . . alters along the longitudinal electric field occurring between the electrode 23 and the electrode 24, and the liquid crystal molecules $27m$, $27m$, . . . are thus set in the approximately normal orientated state (i.e., the approximately uniaxial orientated state).

As described above, at the time of voltage application, the liquid crystal molecules $27m$, $27m$, . . . contained in the liquid crystal layer 27 are set in the approximately normal orientated state (i.e., the approximately uniaxial orientated state) as a whole. However, as for the liquid crystal molecules $27m$, $27m$, . . . , which are located in the vicinity of each of the orientating film 25 and the orientating film 26, the liquid crystal molecules $27m$, $27m$, . . . receive the effects of each of the orientating film 25 and the orientating film 26, and it often occurs that a hybrid orientated state arises, in which the direction of the orientation of the liquid crystal molecules $27m$, $27m$, . . . alters successively from the approximately normal direction toward each of the directions of the orientation of the orientating film 25 and the orientating film 26.

FIG. 2 shows the state at the time of voltage application across the liquid crystal layer 27. In FIG. 2, the region of the liquid crystal layer 27, which region has been set in the approximately normal orientated state, is represented by a reference letter V. Also, the regions of the liquid crystal layer 27, which regions have been set in the hybrid orientated state, are represented by a reference letter H. In FIG. 2, as an aid in facilitating the explanation, the hybrid orientated state is illustrated such that the direction of the major axis of the liquid crystal molecule $27m$, which is located close to the orientating film 25, may coincide approximately perfectly with the direction of the orientation of the orientating film 25, and such that the direction of the major axis of the liquid crystal molecule $27m$, which is located close to the orientating film 26, may coincide approximately perfectly with the direction of the orientation of the orientating film 26. However, actually, the level of the failure in orientation of the liquid crystal molecules $27m$, $27m$, . . . falling within each of the regions H, H of the liquid crystal layer 27, which regions have been set in the hybrid orientated state, is markedly lower than the level of the failure in orientation illustrated in FIG. 2.

In this embodiment of the phase difference compensation element 10, the first phase difference compensating layer 12 acts to perform the phase difference compensation with respect to the birefringent characteristics of the liquid crystal molecules $27m$, $27m$, . . . , which have been set in the approximately normal orientated state at the time of voltage application. Also, the second phase difference compensating layer 13 acts to perform the phase difference compensation with respect to the birefringent characteristics of the liquid crystal molecules $27m$, $27m$, . . . located in the vicinity of each of the orientating film 25 and the orientating film 26, which liquid crystal molecules $27m$, $27m$, . . . have been set in the hybrid orientated state at the time of voltage application. As described above, at the time of voltage application, the liquid crystal molecules $27m$, $27m$, . . . , which are located in the vicinity of each of the orientating film 25 and the orientating film 26, receive the effects of each of the orientating film 25 and the orientating film 26 and are thus set in the hybrid orientated state, in which the direction of the orientation (i.e., the tilt angle, and the like) of the liquid crystal molecules 27m, 27m, . . . alters successively from the approximately normal direction toward each of the directions of the orientation of the orientating film 25 and the orientating film 26.

(Layer Constitution of the Phase Difference Compensation Element 10)

The layer constitution of the phase difference compensation element 10 will hereinbelow be described in detail. This embodiment of the phase difference compensation element 10 is an inorganic phase difference compensation element, and all of the constituent members are constituted of inorganic materials. In this embodiment, the second phase difference compensating layer 13 has a characteristic layer constitution.

<Light Transmissive Base Material>

No limitation is imposed upon the material for constituting the light transmissive base material 11. By way of example, the light transmissive base material 11 may be constituted of glass, sapphire, rock crystal, or the like. Also, no limitation is imposed upon the shape of the light transmissive base material 11. However, the light transmissive base material 11 should preferably have a plate-like shape. In this embodiment, the light transmissive base material 11, the liquid crystal cell, and the polarizer are constituted as independent members. Alternatively, the base plate of the liquid crystal cell, which base plate is located on the side corresponding to the phase difference compensation element 10, may be utilized as the light transmissive base material 11. As another alternative, the polarizer, which is located on the side corresponding to the phase difference compensation element 10, may be utilized as the light transmissive base material 11.

<First Phase Difference Compensating Layer>

The first phase difference compensating layer 12 acts to perform the phase difference compensation with respect to the birefringent characteristics of the liquid crystal molecules 27m, 27m, . . . (i.e., the liquid crystal molecules 27m, 27m, . . . falling within the region V illustrated in FIG. 2), which have been set in the approximately normal orientated state (i.e., the approximately uniaxial orientated state) at the time of voltage application.

The first phase difference compensating layer 12 exhibits the uniaxial negative birefringent characteristics and has the so-called negative C-plate characteristics. The first phase difference compensating layer 12 is constituted of a multi-layer film, in which two high refractive index films 12A, 12A having a comparatively high refractive index and two low refractive index films 12B, 12B having a comparatively low refractive index have been laminated alternately. Each of the high refractive index films 12A, 12A and the low refractive index films 12B, 12B is constituted of a frontal incidence vacuum deposited film having been formed with a vacuum evaporation technique, in which an inorganic material is evaporated from an approximately normal direction with respect to the surface of the light transmissive base material 11. In the example illustrated in FIG. 2, the two high refractive index films 12A, 12A and the two low refractive index films 12B, 12B are laminated. However, the number of the films constituting the first phase difference compensating layer 12 may be designed arbitrarily.

The optical film thickness of each of the high refractive index films 12A, 12A and the low refractive index films 12B, 12B, which optical film thickness is the product of the physical film thickness and the refractive index, may fall within the range of $1/100$ of a reference wavelength $\lambda$ of the light L2 incident upon the phase difference compensation element 10 to $1/5$ of the reference wavelength $\lambda$ of the light L2 incident upon the phase difference compensation element 10. The optical film thickness of each of the high refractive index films 12A, 12A and the low refractive index films 12B, 12B should preferably fall within the range of $1/50$ of the reference wavelength $\lambda$ of the incident light L2 to $1/5$ of the reference wavelength $\lambda$ of the incident light L2, and should more preferably fall within the range of $1/30$ of the reference wavelength $\lambda$ of the incident light L2 to $1/10$ of the reference wavelength $\lambda$ of the incident light L2.

In cases where the light impinges from the normal direction upon the first phase difference compensating layer 12 having the constitution described above, the incident light contains only the wave (i.e., the TE wave), which has the characteristics such that the electric field vibrates in parallel with the plane of each film. Therefore, the first phase difference compensating layer 12 does not exhibit the birefringent characteristics with respect to the normal incident light. In cases where the light impinges from an oblique direction upon the first phase difference compensating layer 12, an effective refractive index $N_{TE}$ with respect to the wave (i.e., the TE wave component), which has the characteristics such that the electric field vibrates in parallel with the plane of each film, and an effective refractive index $N_{TM}$ with respect to the wave (i.e., the TM wave component), which has the characteristics such that the electric field vibrates in the direction normal to the plane of each film, vary from each other. Therefore, the first phase difference compensating layer 12 exhibits the birefringent characteristics with respect to the oblique incident light. A birefringent index $\Delta n$ of the first phase difference compensating layer 12 may be calculated from the refractive index and the film thickness of each of the high refractive index films 12A, 12A and the low refractive index films 12B, 12B. As the difference between the refractive index of each of the high refractive index films 12A, 12A and the refractive index of each of the low refractive index films 12B, 12B becomes large, the birefringent index $\Delta n$ of the first phase difference compensating layer 12 takes a large value. (Reference may be made to, for example, "Kogaku" (Optics), Vol. 27, No. 1, pp. 12-17, 1998.)

The effective refractive index $N_{TE}$, the effective refractive index $N_{TM}$, and the birefringent index $\Delta n$ of the first phase difference compensating layer 12 may be represented by the formulas shown below.

$$N_{TE} = \sqrt{\{(an_1^2 + bn_2^2), (a+b)\}}$$

$$N_{TM} = \sqrt{[(a+b), \{(a, 'n_1^2) + (b, 'n_2^2)\}]}$$

$$\Delta n = N_{TM} - N_{TE}$$

wherein $n_1$ represents the refractive index of each of the high refractive index films 12A, 12A, $n_2$ represents the refractive index of each of the low refractive index films 12B, 12B, a represents the physical film thickness of each of the high refractive index films 12A, 12A, and b represents the physical film thickness of each of the low refractive index films 12B, 12B.

Specifically, the first phase difference compensating layer 12 has the phase difference compensating function (A) with respect to the birefringent characteristics of the liquid crystal layer 27, in which the liquid crystal molecules 27m, 27m, . . . have been set in the approximately normal orientated state (i.e., the approximately uniaxial orientated state) as a whole at the time of voltage application, with respect to the oblique incident light.

No limitation is imposed upon the retardation value Re (=d·Δn) of the first phase difference compensating layer 12. In order for a good phase difference compensating function (A) to be obtained, a retardation value Re(0) of the first phase difference compensating layer 12 and a retardation value Re(LC) of the liquid crystal layer 27, which retardation value Re(LC) is obtained at the time of application of a maximum voltage, should preferably satisfy the condition, which will be described later.

The proportion of the liquid crystal molecules 27m, 27m, . . . , which are set in the approximately normal orientated state within the liquid crystal layer 27 at the time of application of the maximum voltage, varies in accordance with the kind of the liquid crystal, the cell gap, the maximum voltage value, and the like. For example, in cases where the kind of the liquid crystal and the cell gap are kept at the identical conditions, as the maximum voltage value becomes large, the proportion of the liquid crystal molecules 27m, 27m, . . . , which are set in the approximately normal orientated state within the liquid crystal layer 27 at the time of application of the maximum voltage, is apt to take a large value, and the birefringent characteristics due to the liquid crystal molecules 27m, 27m, . . . , which are set in the approximately normal orientated state, are apt to become high.

Also, as in the cases of the liquid crystal molecules 27m, 27m, . . . , the second phase difference compensating layer 13 has a positive birefringent index. Therefore, at the time of voltage application, besides the liquid crystal molecules 27m, 27m, . . . , the second phase difference compensating layer 13 also acts as a factor for causing a positive retardation to occur. Accordingly, it is necessary for the retardation value Re of the second phase difference compensating layer 13 to be taken into consideration. For example, it is necessary for the thickness of the first phase difference compensating layer 12, or the like, to be taken into consideration in accordance with the thickness of the second phase difference compensating layer 13, or the like.

With the foregoing being taken into consideration, the inventors have found that a good phase difference compensating function (A) is capable of being obtained in cases where the retardation value Re(0) of the first phase difference compensating layer 12 and the retardation value Re(LC) of the liquid crystal layer 27, which retardation value Re(LC) is obtained at the time of application of the maximum voltage, satisfy the condition represented by Formula (Iv):

$$-2 \times Re(LC) \leq Re(0) \leq -0.5 \times Re(LC) \quad \text{(iv)}$$

As for the retardation value Re(0) (=d·Δn), d represents the film thickness of the entire first phase difference compensating layer 12, and Δn represents the birefringent index of the entire first phase difference compensating layer 12. Therefore, the refractive index and the film thickness of each of the high refractive index films 12A, 12A and the low refractive index films 12B, 12B and the film thickness d of the entire first phase difference compensating layer 12 may be designed such that the condition represented by Formula (iv) shown above may be satisfied.

Also, the retardation value Re(LC) of the liquid crystal layer 27 varies in accordance with the wavelengths of the incident light L1 impinging upon the liquid crystal device 40. Therefore, the retardation value Re(LC) of the liquid crystal layer 27 with respect to the reference wavelength λ of the incident light L1 should preferably be calculated, and the retardation value Re(0) of the first phase difference compensating layer 12 should preferably be set such that the condition represented by Formula (iv) shown above may be satisfied.

No limitation is imposed upon the constituent material for constituting each of the high refractive index films 12A, 12A and the material for constituting the low refractive index films 12B, 12B. From the view point of the easiness of the vacuum evaporation, the light transmissivity, and the like, a material having a comparatively high refractive index and a material having a comparatively low refractive index should preferably be selected from the group consisting of $TiO_2$ (2.2 to 2.4), $ZrO_2$ (2.20), $SiO_2$ (1.40 to 1.48), $MgF_2$ (1.39), $CaF_2$ (1.30), $CeO_2$ (2.45), $SnO_2$ (2.30), $Ta_2O_5$ (2.12), $In_2O_3$ (2.00), $ZrTiO_4$ (2.01), $HfO_2$ (1.91), $Al_2O_3$ (1.59 to 1.70), $MgO$ (1.70), $AlF_3$, diamond thin film, $LaTiO_x$, and samarium oxide. Each of the high refractive index films 12A, 12A and the low refractive index films 12B, 12B may contain at least two kinds of the constituent materials selected from the group described above. (The values in the parentheses for the above-enumerated constituent materials are the approximate values of the refractive indexes.)

Examples of appropriate combinations of the constituent materials for the high refractive index film 12A/the low refractive index film 12B include $TiO_2/SiO_2$, $Ta_2O_5/Al_2O_3$, $HfO_2/SiO_2$, $MgO/MgF_2$, $ZrTiO_4/Al_2O_3$, $CeO_2/CaF_2$, $ZrO_2/SiO_2$, and $ZrO_2/Al_2O_3$.

<Second Phase Difference Compensating Layer>

The second phase difference compensating layer 13 acts to perform the phase difference compensation with respect to the birefringent characteristics of the liquid crystal molecules 27m, 27m, . . . located in the vicinity of each of the orientating film 25 and the orientating film 26, which liquid crystal molecules 27m, 27m, . . . have been set in the hybrid orientated state at the time of voltage application. As described above, at the time of voltage application, the liquid crystal molecules 27m, 27m, . . . , which are located in the vicinity of each of the orientating film 25 and the orientating film 26, receive the effects of each of the orientating film 25 and the orientating film 26 and are thus set in the hybrid orientated state, in which the direction of the orientation of the liquid crystal molecules 27m, 27m, . . . alters successively from the approximately normal direction toward each of the directions of the orientation of the orientating film 25 and the orientating film 26.

The second phase difference compensating layer 13 has the laminate structure constituted of the "a" number, where a≧2, of the inorganic oblique incidence vacuum deposited films varying in direction of oblique evaporation. Each of the inorganic oblique incidence vacuum deposited films constituting the second phase difference compensating layer 13 is a birefringent film constituted of a plurality of pillar-shaped crystals extending in a direction of oblique evaporation, which pillar-shaped crystals stand side by side with respect to the direction of the surface of the light transmissive base material 11. The second phase difference compensating layer 13 has a positive birefringent index and has the so-called O-plate characteristics.

The second phase difference compensating layer 13 is designed so as to satisfy the conditions represented by Formula (i) and Formula (ii):

$$Re(1) < Re(a) \quad \text{(i)}$$

$$Re(b-1) \leq Re(b) \quad \text{(ii)}$$

where b is an arbitrary integer satisfying the condition 2≦b≦a wherein Re(i) represents the retardation value d·Δn of the inorganic oblique incidence vacuum deposited film which has been formed at the i-th stage of film formation among the stages of forming the "a" number of the inorganic oblique incidence vacuum deposited films, respectively, where $1 \leq i \leq a$, d represents the film thickness, and $\Delta n$ represents the birefringent index.

Formula (i) shown above represents that the retardation value Re(1) of the inorganic oblique incidence vacuum deposited film, which has been formed as the bottom layer among the "a" number, where $a \geq 2$, of the inorganic oblique incidence vacuum deposited films constituting the second phase difference compensating layer 13, is smaller than the retardation value Re(a) of the inorganic oblique incidence vacuum deposited film, which has been formed as the top layer among the "a" number of the inorganic oblique incidence vacuum deposited films constituting the second phase difference compensating layer 13. Also, Formula (ii) shown above represents that, with respect to two arbitrary inorganic oblique incidence vacuum deposited films, which are adjacent to each other and are overlaid one upon the other among the "a" number of the inorganic oblique incidence vacuum deposited films constituting the second phase difference compensating layer 13, the retardation value Re(b−1) of the inorganic oblique incidence vacuum deposited film, which has been formed as the lower layer between the two inorganic oblique incidence vacuum deposited films adjacent to each other, is smaller than the retardation value Re(b) of the inorganic oblique incidence vacuum deposited film, which has been formed as the upper layer between the two inorganic oblique incidence vacuum deposited films adjacent to each other, or that the retardation value Re(b−1) and the retardation value Re(b) may be equal to each other.

It is necessary for the second phase difference compensating layer 13 to satisfy both the condition represented by Formula (i) shown above and the condition represented by Formula (ii) shown above. Therefore, in cases where a=2, it is necessary for the second phase difference compensating layer 13 to satisfy the condition Re(1)<Re(2). In cases where a=3, it is necessary for the second phase difference compensating layer 13 to satisfy the condition Re(1)<Re(2)<Re(3). In cases where a=4, it is necessary for the second phase difference compensating layer 13 to satisfy the condition Re(1)<Re(2)≦Re(3)<Re(4). In cases where $a \geq 5$, it is necessary for the second phase difference compensating layer 13 to satisfy the condition Re(1)<Re(2)≦Re(3)≦ . . . ≦Re(a−1)<Re(a).

FIG. 1 shows the embodiment, in which the second phase difference compensating layer 13 is constituted of four inorganic oblique incidence vacuum deposited films 13A, 13B, 13C, and 13D (i.e., a=4). The embodiment, in which the second phase difference compensating layer 13 is constituted of the four inorganic oblique incidence vacuum deposited films 13A, 13B, 13C, and 13D (i.e., a=4), will be described hereinbelow.

Figure 3:
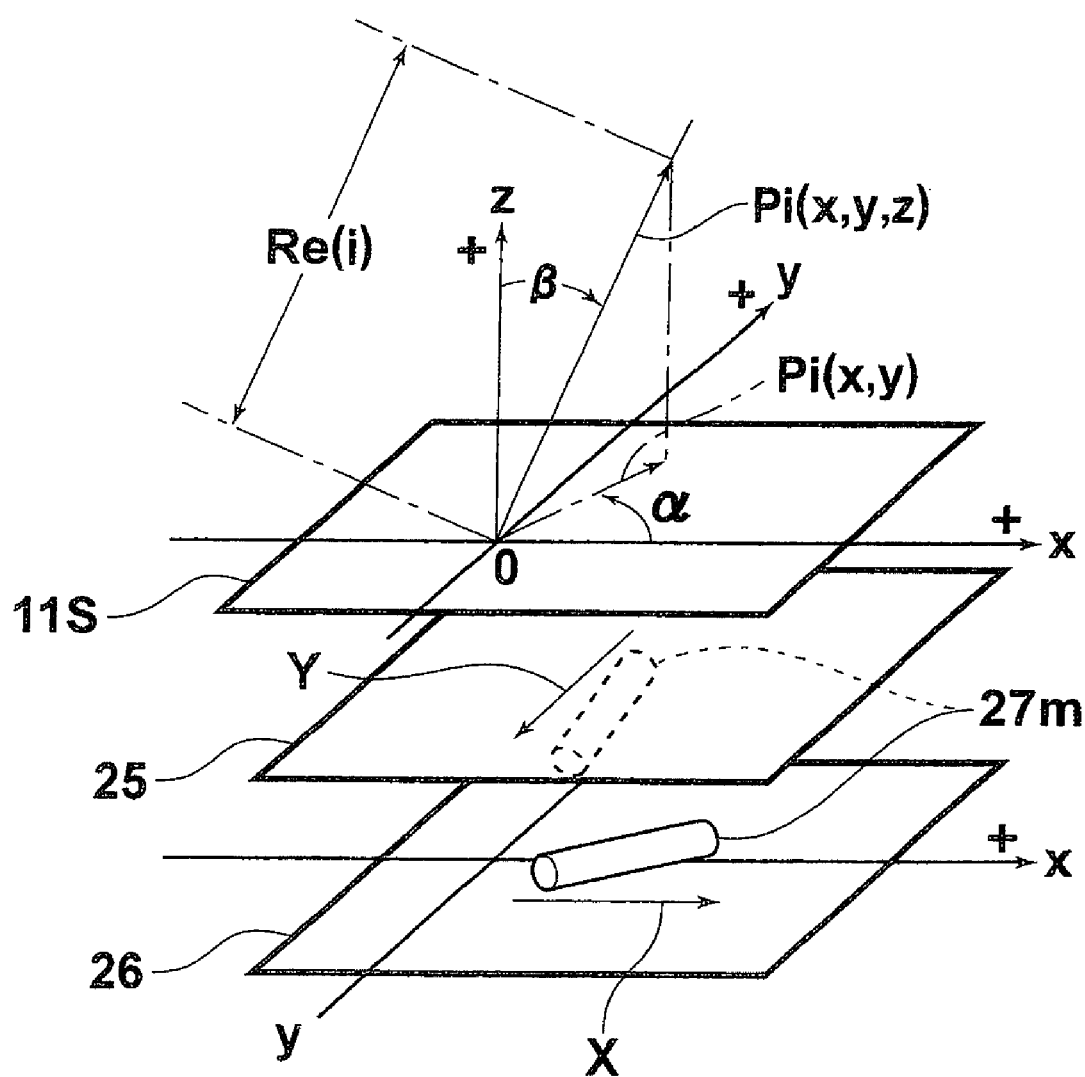
FIG. 3 is an explanatory view showing a direction of oblique evaporation of an inorganic oblique incidence vacuum deposited film and a relationship between the direction of oblique evaporation and orientation axes of orientating films.

The four inorganic oblique incidence vacuum deposited films 13A, 13B, 13C, and 13D, which constitute the second phase difference compensating layer 13, vary in direction of oblique evaporation. The direction of oblique evaporation of an inorganic oblique incidence vacuum deposited film will be described hereinbelow with reference to FIG. 3. FIG. 3 also shows a relationship between the direction of oblique evaporation and orientation axes of the orientating film 25 and the orientating film 26. (In FIG. 3, as an aid in facilitating the explanation, the order of the arrangement is altered.)

FIG. 3 illustrates the direction of oblique evaporation of the inorganic oblique incidence vacuum deposited film which has been formed at the i-th stage of film formation, where $1 \leq i \leq a$, among the stages of forming the "a" number of the inorganic oblique incidence vacuum deposited films, respectively. In FIG. 3, the optic axis vector of the inorganic oblique incidence vacuum deposited film which has been formed at the i-th stage of film formation is represented by $P_i(x, y, z)$. The optic axis vector $P_i(x, y, z)$ of the inorganic oblique incidence vacuum deposited film which has been formed at the i-th stage of film formation approximately coincides with the xyz direction vector of the direction of oblique evaporation. Therefore, both the optic axis vector of the inorganic oblique incidence vacuum deposited film and the xyz direction vector of the direction of oblique evaporation are herein represented by the same reference letter. Also, in FIG. 3, the surface of the light transmissive base material 11 is represented by 11S. Further, the orientation axis of the orientating film 26, which is located on the side of the liquid crystal cell 20 close to the phase difference compensation element 10, is taken as the x axis. The axis, which intersects orthogonally with the x axis in the plane of the orientating film 26, is taken as the y axis. The axis, which is normal to the plane of the orientating film 26, is taken as the z axis. The "+" direction of each of the x, y, and z axes is illustrated in FIG. 3. In FIG. 3, the origin, the x, y, and z axes, and the "+" and "−" directions of each of the x, y, and z axes are set for facilitating the explanation. The reference system for representing the direction of oblique evaporation may be altered arbitrarily. The direction of the orientation of the orientating film 26 is represented by a reference letter X, and the direction of the orientation of the orientating film 25 is represented by a reference letter Y.

The direction of oblique evaporation of the inorganic oblique incidence vacuum deposited film which has been formed at the i-th stage of film formation may be specified by the azimuthal angle α and the polar angle β. The azimuthal angle α is the angle made between the xy direction vector $P_i(x, y)$ of the direction of oblique evaporation and the x axis. The polar angle β is the angle made between the xyz direction vector $P_i(x, y, z)$ of the direction of oblique evaporation and the z axis. As an aid in facilitating the explanation, as for the azimuthal angle α, the counter-clockwise direction in FIG. 3 is taken as the "+" direction.

In this embodiment, each of the four inorganic oblique incidence vacuum deposited films 13A, 13B, 13C, and 13D, which constitute the second phase difference compensating layer 13, is formed under the conditions such that the azimuthal angle α of the direction of oblique evaporation and/or the polar angle β of the direction of oblique evaporation may vary for different inorganic oblique incidence vacuum deposited films 13A, 13B, 13C, and 13D.

As for each of the inorganic oblique incidence vacuum deposited films 13A, 13B, 13C, and 13D, as the film thickness d becomes large, the film surface is apt to become uneven. Also, as the polar angle β of the direction of oblique evaporation becomes large, the birefringent index Δn is apt to become high, and the film surface is apt to become uneven. Specifically, as the retardation value Re becomes large, the film surface is apt to become uneven.

In this embodiment, the second phase difference compensating layer 13 has the constitution satisfying both the condition represented by Formula (i) shown above and the condition represented by Formula (ii) shown above. Specifically, the plurality of the inorganic oblique incidence vacuum deposited films 13A, 13B, 13C, and 13D, which constitute the second phase difference compensating layer 13, are formed with the vacuum evaporation in the order of the increasing retardation value Re. The inventors have found that, in cases where the second phase difference compensating layer 13 has the constitution described above, such that the inorganic oblique incidence vacuum deposited films 13A, 13B, 13C, and 13D are formed in the order of the increasing level of the surface unevenness, unnecessary films need not be formed among the plurality of the inorganic oblique incidence vacuum deposited films, the occurrence of vacuum evaporation failures of the inorganic oblique incidence vacuum deposited films, which are formed by later vacuum evaporation processing, is capable of being suppressed, and the occurrence of cloudiness, and the like, is capable of being suppressed. The inventors have thus found that the plurality of the inorganic oblique incidence vacuum deposited films having good crystal structures are capable of being laminated reliably. Since the unnecessary films need not be formed among the plurality of the inorganic oblique incidence vacuum deposited films, the second phase difference compensating layer 13 is capable of being produced with a process markedly easier than the cases of the phase difference compensation element described in, for example, Japanese Unexamined Patent Publication No. 10 (1998)-081955, in which the frontal incidence vacuum deposited films intervene among a plurality of inorganic oblique incidence vacuum deposited films. Also, with the second phase difference compensating layer 13, there is no risk that the optical characteristics, such as the transmittance, become bad due to the presence of the unnecessary films. With this embodiment, for the reasons described above, the second phase difference compensating layer 13, which has good phase difference compensating functions and good optical characteristics, such as the transmittance, is capable of being formed reliably. Heretofore, nothing has been studied with regard to the relationship among the retardation values Re, Re, ... of the plurality of the inorganic oblique incidence vacuum deposited film.

As described above, in cases where the second phase difference compensating layer 13 is constituted of at least four inorganic oblique incidence vacuum deposited films, the second phase difference compensating layer 13 may contain a plurality of the inorganic oblique incidence vacuum deposited films, whose retardation values Re, Re, ... are equal to one another. An inorganic oblique incidence vacuum deposited film, in which the polar angle $\beta$ is large, is apt to have a high level of surface unevenness. Therefore, in cases where the second phase difference compensating layer 13 contains the plurality of the inorganic oblique incidence vacuum deposited films, whose retardation values Re, Re, ... are equal to one another, the inorganic oblique incidence vacuum deposited film, in which the polar angle $\beta$ is smaller than the polar angles $\beta, \beta, \ldots$ of the other inorganic oblique incidence vacuum deposited films, should preferably be formed on the side closer to the light transmissive base material 11 than the other inorganic oblique incidence vacuum deposited films are.

Also, under the condition a≧4, the second phase difference compensating layer 13 should particularly preferably satisfy the condition represented by the formula Re(b−1)<Re(b), where b has the same meaning as that described above. Specifically, in cases where the retardation value Re(1) and the retardation value Re(a) are kept at predetermined values, and the retardation values Re, Re, ... of the inorganic oblique incidence vacuum deposited films, which are formed between the inorganic oblique incidence vacuum deposited film having the retardation value Re(1) and the inorganic oblique incidence vacuum deposited film having the retardation value Re(a), are to be set, the second phase difference compensating layer 13 should particularly preferably have the constitution, such that an inorganic oblique incidence vacuum deposited film having an identical retardation value Re is not contained in the inorganic oblique incidence vacuum deposited films, which are formed between the inorganic oblique incidence vacuum deposited film having the retardation value Re(1) and the inorganic oblique incidence vacuum deposited film having the retardation value Re(a). In such cases, the difference between the retardation values Re, Re of the inorganic oblique incidence vacuum deposited films, which are adjacent to each other, is capable of being kept small, and therefore the occurrence of the vacuum evaporation failures is capable of being suppressed more reliably.

No limitation is particularly imposed upon the direction of oblique evaporation of each of the inorganic oblique incidence vacuum deposited films 13A, 13B, 13C, and 13D. However, such that the phase difference compensating function (B) with respect to the birefringent characteristics of the liquid crystal molecules 27m, 27m, ..., which have been set in the hybrid orientated state, may be enhanced, the conditions described below should preferably be satisfied.

Specifically, each of the inorganic oblique incidence vacuum deposited films 13A, 13B, 13C, and 13D should preferably be set such that the xy direction vector $P_i(x, y)$ of the direction of oblique evaporation has the vector orientation different from the direction of the x axis, i.e., the direction of orientation X of the orientating film 26, which is located on the side of the liquid crystal cell 20, which side is close to the phase difference compensation element 10.

Further, the x and y coordinate components (Ax, Ay) of the composite vector ($\Sigma P_i$), which has been composed from the optic axis vectors $P_i(x, y, z)$ of the inorganic oblique incidence vacuum deposited films 13A, 13B, 13C, and 13D, should preferably satisfy the conditions represented by Formula (iii):

$$0 \text{ nm} \leq |Ax| \leq 100 \text{ nm}, 50 \text{ nm} \leq |Ay| \leq 200 \text{ nm} \quad \text{(iii)}$$

each of the optic axis vectors $P_i(x, y, z)$ of the inorganic oblique incidence vacuum deposited films 13A, 13B, 13C, and 13D being calculated with Formula (I):

$$P_i(x,y,z)=(Re(i)\times\cos\alpha_i\times\sin\beta_i, Re(i)\times\sin\alpha_i\times\sin\beta_i, Re(i)\times\cos\beta_i) \quad \text{(I)}$$

wherein $P_i$ represents the optic axis vector of the inorganic oblique incidence vacuum deposited film which has been formed at the i-th stage of film formation among the stages of forming the inorganic oblique incidence vacuum deposited films 13A, 13B, 13C, and 13D, respectively, where 1≦i≦a (in this case, a=4), $\alpha_i$ represents the azimuthal angle of the direction of oblique evaporation of the inorganic oblique incidence vacuum deposited film which has been formed at the i-th stage of film formation among the stages of forming the inorganic oblique incidence vacuum deposited films 13A, 13B, 13C, and 13D, respectively, and $\beta_i$ represents the polar angle of the direction of oblique evaporation of the inorganic oblique incidence vacuum deposited film which has been formed at the i-th stage of film formation among the stages of forming the inorganic oblique incidence vacuum deposited films 13A, 13B, 13C, and 13D, respectively, the azimuthal angle being the angle made between the xy direction vector of the direction of oblique evaporation and the x axis, the polar angle being the angle made between the xyz direction vector of the direction of oblique evaporation and the z axis.

The aforesaid composite vector ($\Sigma P_i$), which has been composed from the optic axis vectors $P_i(x, y, z)$ of the inorganic oblique incidence vacuum deposited films 13A, 13B, 13C, and 13D, corresponds to the average optic axis vector of the optic axis vectors $P_i(x, y, z)$ of the plurality of the inorganic oblique incidence vacuum deposited films 13A, 13B, 13C, and 13D.

Each of the inorganic oblique incidence vacuum deposited films 13A, 13B, 13C, and 13D is capable of being formed with one of known oblique evaporation techniques. The constituent materials of the inorganic oblique incidence vacuum deposited films 13A, 13B, 13C, and 13D may be selected from various inorganic materials. From the view point of the easiness of the oblique evaporation, the light transmissivity, and the like, the constituent materials of the inorganic oblique incidence vacuum deposited films 13A, 13B, 13C, and 13D should preferably be selected from the group consisting of $TiO_2$, $SiO_2$, $ZrO_2$, and $Ta_2O_3$. The inorganic oblique incidence vacuum deposited films 13A, 13B, 13C, and 13D constituting the second phase difference compensating layer 13 may be constituted of an identical material. Alternatively, the inorganic oblique incidence vacuum deposited films 13A, 13B, 13C, and 13D may be constituted of different materials. Also, each of the inorganic oblique incidence vacuum deposited films 13A, 13B, 13C, and 13D may contain at least two constituent materials.

At the time of the formation of each of the inorganic oblique incidence vacuum deposited films 13A, 13B, 13C, and 13D, the oblique evaporation should preferably be performed, while the film thickness d is being monitored by use of a rock crystal type of a film thickness monitor, or the like. Also, the oblique evaporation should preferably be performed, while the birefringent index $\Delta n$ is being measured by use of an ellipsometer, or the like. In cases where the film thickness d and the birefringent index $\Delta n$ are being thus monitored, each of the inorganic oblique incidence vacuum deposited films 13A, 13B, 13C, and 13D having the desired retardation values Re, Re, ... is capable of being formed reliably, and the second phase difference compensating layer 13 satisfying the conditions represented by Formula (i) and Formula (ii) shown above is capable of being obtained reliably.

(Anti-Reflection Layers)

Each of the anti-reflection layer 14 and the anti-reflection layer 15 prevents surface reflection of the phase difference compensation element 10 from occurring and enhances the light utilization efficiency of the phase difference compensation element 10.

No limitation is imposed upon the layer constitution of each of the anti-reflection layer 14 and the anti-reflection layer 15. However, each of the anti-reflection layer 14 and the anti-reflection layer 15 should preferably be constituted of a single-layer film of $MgF_2$ acting as a low refractive index material, which film is formed such that the optical film thickness is equal to $\lambda/4$, where $\lambda$ represents the reference wavelength of the incident light L2. Alternatively, each of the anti-reflection layer 14 and the anti-reflection layer 15 should preferably be constituted of a multi-layer film made from a laminate of different kinds of deposition materials. In such cases, the multi-layer film may be, for example, a film having a three-layer structure constituted of an $SiO_2$ film (optical film thickness: $\lambda/4$)/a $TiO_2$ film (optical film thickness: $\lambda/2$)/an $SiO_2$ film (optical film thickness: $\lambda/4$). The anti-reflection layer 14 and the anti-reflection layer 15 may have an identical layer structure. Alternatively, the anti-reflection layer 14 and the anti-reflection layer 15 may have different layer structures.

As described above, the phase difference compensation element 10 should preferably has the constitution, in which the anti-reflection layer 14 is formed on the outermost surface on the light incidence side of the phase difference compensation element 10, and in which the anti-reflection layer 15 is formed on the outermost surface on the light radiating side of the phase difference compensation element 10. The phase difference compensation element 10 may have the constitution, in which the anti-reflection layer is formed on the outermost surface on the light incidence side of the phase difference compensation element 10 and/or the outermost surface on the light radiating side of the phase difference compensation element 10.

Each of the phase difference compensation element 10 and the liquid crystal device 40 is constituted in the manner described above.

This embodiment of the phase difference compensation element 10 is constituted of the one birefringent laminate 10A. The birefringent laminate 10A contains the light transmissive base material 11, the first phase difference compensating layer 12 for performing the phase difference compensation with respect to the birefringent characteristics of the liquid crystal molecules 27m, 27m, ... having been set in the approximately uniaxial orientated state, and the second phase difference compensating layer 13 for performing the phase difference compensation with respect to the birefringent characteristics of the liquid crystal molecules 27m, 27m, ... having been set in the hybrid orientated state. The first phase difference compensating layer 12 and the second phase difference compensating layer 13 are laminated on the light incidence side surface of the light transmissive base material 11. The second phase difference compensating layer 13 has the laminate structure constituted of the "a" number, where $a \geq 2$, of the inorganic oblique incidence vacuum deposited films (e.g., the four inorganic oblique incidence vacuum deposited films 13A, 13B, 13C, and 13D) varying in direction of oblique evaporation. The phase difference compensation element 10 having the constitution described above has both the good phase difference compensating function (A) with respect to the birefringent characteristics of the liquid crystal molecules 27m, 27m, ..., which have been set in the approximately normal orientated state at the time of voltage application, and the good phase difference compensating function (B) with respect to the birefringent characteristics of the liquid crystal molecules 27m, 27m, ..., which have been set in the hybrid orientated state at the time of voltage application.

Also, the second phase difference compensating layer 13 of the phase difference compensation element 10 satisfies the conditions represented by Formula (i) and Formula (ii):

$$Re(1) < Re(a) \quad \text{(i)}$$

$$Re(b-1) \leq Re(b) \quad \text{(ii)}$$

where b is an arbitrary integer satisfying the condition $2 \leq b \leq a$ wherein Re(i) represents the retardation value $d \cdot \Delta n$ of the inorganic oblique incidence vacuum deposited film which has been formed at the i-th stage of film formation among the stages of forming the "a" number of the inorganic oblique incidence vacuum deposited films, respectively, where $1 \leq i \leq a$, d represents the film thickness, and $\Delta n$ represents the birefringent index.

As described above in detail, in cases where the retardation value Re ($= d \cdot \Delta n$) becomes large, the inorganic oblique incidence vacuum deposited film is apt to have an uneven surface. Therefore, with the phase difference compensation element 10, the plurality of the inorganic oblique incidence vacuum deposited films are formed with the vacuum evaporation in the order of the increasing retardation value Re. Accordingly, unnecessary films need not be formed among the plurality of the inorganic oblique incidence vacuum deposited films, and the occurrence of vacuum evaporation failures of the inorganic oblique incidence vacuum deposited films, which are formed by later vacuum evaporation processing, is capable of being suppressed.

As a result, with this embodiment, it is possible to provide the inorganic phase difference compensation element 10, which has the good phase difference compensating function (B) with respect to the birefringent characteristics of the liquid crystal molecules 27m, 27m, . . . having been set in the hybrid orientated state, and which has good optical characteristics, such as the phase difference compensating functions and the transmittance, good production easiness, and good production stability.

This embodiment of the phase difference compensation element 10 is the inorganic phase difference compensation element. Therefore, the phase difference compensation element 10 has a high heat resistance, a high light resistance, good chemical stability, and the like, and exhibits good long term use stability under severe heat and light conditions. Accordingly, the phase difference compensation element 10 is appropriate for use in, for example, liquid crystal devices to be loaded in projection type display apparatuses, such as projectors.

With the liquid crystal device 40, in which this embodiment of the phase difference compensation element 10 is employed, the phase difference is capable of being accurately compensated for. Also, the liquid crystal device 40 has good displaying quality, such as contrast and the angle of field, and exhibits good long term use stability under the use conditions of projection type display apparatuses.

(Design Modifications)

The phase difference compensation element and the liquid crystal device in accordance with the present invention are not limited to the embodiments described above and may be embodied in various other ways.

In the embodiment described above, the phase difference compensation element 10 is constituted of the one birefringent laminate 10A. The birefringent laminate 10A contains the light transmissive base material 11, the first phase difference compensating layer 12, and the second phase difference compensating layer 13, which is constituted of the plurality of the inorganic oblique incidence vacuum deposited films. The first phase difference compensating layer 12 and the second phase difference compensating layer 13 are laminated on the light incidence side surface of the light transmissive base material 11.

The phase difference compensation element in accordance with the present invention is not limited to the embodiment described above and may be constituted such that a plurality of birefringent laminates 10A, 10A, . . . are overlaid one another. (The plurality of the birefringent laminates 10A, 10A, . . . may be disposed at a fine spacing from one another.) In cases where the phase difference compensation element in accordance with the present invention is constituted such that the plurality of the birefringent laminates 10A, 10A, . . . are overlaid one another, the anti-reflection layers need not necessarily be formed on each of the birefringent laminates 10A, 10A, . . . . The anti-reflection layer may be formed at least on the outermost surface on the light incidence side of the combination of the plurality of the birefringent laminates 10A, 10A, . . . and/or the outermost surface on the light radiating side of the combination of the plurality of the birefringent laminates 10A, 10A, . . . .

In the embodiment described above, the birefringent laminate 10A has the laminate structure containing the first phase difference compensating layer 12 and the second phase difference compensating layer 13, which is constituted of the plurality of the inorganic oblique incidence vacuum deposited films. With the constitution described above, both the good phase difference compensating function (A) with respect to the birefringent characteristics of the liquid crystal molecules 27m, 27m, . . . , which have been set in the approximately normal orientated state at the time of voltage application, and the good phase difference compensating function (B) with respect to the birefringent characteristics of the liquid crystal molecules 27m, 27m, . . . , which have been set in the hybrid orientated state at the time of voltage application, are capable of being obtained. Therefore, the phase difference compensation element in accordance with the present invention should preferably have the constitution described above. However, the phase difference compensation element in accordance with the present invention is applicable to a phase difference compensation element comprising at least one birefringent laminate, which has a laminate structure constituted of at least a plurality of inorganic oblique incidence vacuum deposited films.

The phase difference compensation element 10 described above is constituted as the inorganic phase difference compensation element. However, the phase difference compensation element in accordance with the present invention is also applicable to an organic phase difference compensation element. In such cases, in lieu of the second phase difference compensating layer being constituted so as to have the laminate structure constituted of the "a" number, where a≧2, of the inorganic oblique incidence vacuum deposited films, the second phase difference compensating layer may be constituted such that the second phase difference compensating layer has the laminate structure constituted of the "a" number, where a≧2, of organic birefringent films, and such that, as in the cases of the second phase difference compensating layer 13 in the aforesaid embodiment, the second phase difference compensating layer satisfies the conditions represented by Formula (i) and Formula (ii) shown above, wherein Re(i) represents the retardation value d·Δn of the birefringent film which has been formed at the i-th stage of film formation among the stages of forming the "a" number of the birefringent films, respectively, where 1≦i≦a.

Also, in the embodiment of the liquid crystal device 40 described above, the phase difference compensation element 10 is located only on the light radiating side of the liquid crystal cell 20. In the transmission type of the liquid crystal device 40, the phase difference compensation element 10 may be located on the light incidence side of the liquid crystal cell 20 and/or the light radiating side of the liquid crystal cell 20.

The liquid crystal device 40 is constituted as the TN mode transmission type of liquid crystal device operating in the normally white mode. The phase difference compensation element in accordance with the present invention is also applicable to other types of the liquid crystal devices.

The liquid crystal device 40 described above is adapted for use in a projection type display apparatus. The phase difference compensation element in accordance with the present invention is also capable of being used for a liquid crystal device, which is utilized alone as a display device. In the cases of the liquid crystal device, which is utilized alone as the display device, ordinarily, a color filter having a red (R), green (G), and blue (B) color pattern in accordance with a pixel pattern is incorporated in the liquid crystal device, and one pixel is constituted of R, G, and B three dots. In such cases, the color of the radiated light varies for different displaying dots. Therefore, for example, the reference wavelength may be set at the central wavelength of the green light, and the retardation value Re of each of the layers constituting the phase difference compensation element may thereby be designed. Also, the phase difference compensation element should preferably be constituted so as to have a micro-array structure, in which the retardation value Re of each layer has been designed for each of the displaying dots and in accordance with the central wavelength of the color light radiated out from the liquid crystal cell. In such cases, more accurate phase difference compensation is capable of being performed.

The phase difference compensation element in accordance with the present invention is also applicable to the use applications other than the liquid crystal device.

[Projection Type Display Apparatus]

An embodiment of the projection type display apparatus in accordance with the present invention will be described hereinbelow with reference to FIG. 4. The embodiment of the projection type display apparatus in accordance with the present invention is constituted as a full color projection type display apparatus provided with liquid crystal devices (i.e., light modulating devices) 40R, 40G, and 40B for modulating red light L(R), green light L(G), and blue light L(B), respectively. The embodiment of the projection type display apparatus in accordance with the present invention will hereinbelow be described by taking a projector as an example.

Each of the liquid crystal devices 40R, 40G, and 40B is constituted of the aforesaid embodiment of the liquid crystal device 40. Phase difference compensation elements 10R, 10G, and 10B, each of which is constituted of the aforesaid embodiment of the phase difference compensation element 10, are employed in the liquid crystal devices 40R, 40G, and 40B, respectively. The phase difference compensation elements 10R, 10G, and 10B may have identical optical characteristics. However, the retardation value Re(LC) of the liquid crystal layer 27 varies for different wavelengths of the incident light. Therefore, the phase difference compensation elements 10R, 10G, and 10B should preferably have different optical characteristics such that the phase difference compensating functions are optimized in accordance with the reference wavelength of the color light to be modulated. For example, the phase difference compensating functions of each of the phase difference compensation elements 10R, 10G, and 10B are capable of being optimized with a technique, wherein the film thickness d of the first phase difference compensating layer 12 is altered in accordance with the reference wavelength of the color light to be modulated. The constituent members (i.e., the liquid crystal cells 20, 20, 20, the first polarizers 31, 31, 31, and the second polarizers 32, 32, 32) of the liquid crystal devices 40R, 40G, and 40B other than the phase difference compensation elements 10R, 10G, and 10B are constituted in the same manner.

In this embodiment, a projection type display apparatus 50 comprises one light source 52. The projection type display apparatus 50 also comprises a color light separating optical system (with a reference numeral being omitted) for separating the light, which has been radiated out from the light source 52, into the red light L(R), the green light L(G), and the blue light L(B). The projection type display apparatus 50 further comprises the three liquid crystal devices (i.e., the light modulating devices) 40R, 40G, and 40B for modulating the red light L(R), the green light L(G), and the blue light L(B), respectively. The projection type display apparatus 50 still further comprises a composing prism 64 (acting as a composing optical system) for combines the light, which has been modulated by the liquid crystal device 40R, the light, which has been modulated by the liquid crystal device 40G, and the light, which has been modulated by the liquid crystal device 40B, with one another. The projection type display apparatus 50 also comprises a projecting lens 65 (acting as a projecting optical system) for projecting the composite light, which has been composed by the composing prism 64.

The light source 52 may be constituted of a high-pressure mercury vapor lamp, a light emitting diode (LED), a laser, or the like. A cut-off filter 53, an integrator (a rod lens, or the like) 54, a relay lens 55, a collimator lens 56, and a mirror 57 are located between the light source 52 and the color light separating optical system. The cut-off filter 53 filters out unnecessary ultra violet light and unnecessary infrared light from the light, which has been radiated out from the light source 52. The integrator 54 homogenizes the white light, which has been radiated out from the cut-off filter 53. The relay lens 55 and the collimator lens 56 collimates the light, which has been radiated out from the integrator 54. The mirror 57 reflects the light, which has been radiated out from the collimator lens 56, toward the side of the color light separating optical system.

The color light separating optical system is constituted of dichroic mirrors 58R, 58G and mirrors 58B, 60.

The white light, which has been reflected from the mirror 57, impinges upon the dichroic mirror 58R, which selectively transmits only the red light L(R) and reflects the light having wavelengths falling within the wavelength distribution range other than the wavelength distribution range of the red light L(R). The white light is thus separated by the dichroic mirror 58R into the red light L(R) and the light having wavelengths falling within the wavelength distribution range other than the wavelength distribution range of the red light L(R). The red light L(R), which has been separated by the dichroic mirror 58R from the white light, impinges upon the liquid crystal device 40R and is modulated in accordance with an image signal. The light, which has been reflected from the dichroic mirror 58R, impinges upon the dichroic mirror 58G, which selectively reflects only the green light L(G) and transmits the light having wavelengths falling within the wavelength distribution range other than the wavelength distribution range of the green light L(G). The light, which has been reflected from the dichroic mirror 58R, is thus separated by the dichroic mirror 58G into the green light L(G) and the light having wavelengths falling within the wavelength distribution range other than the wavelength distribution range of the green light L(G). The green light L(G), which has been separated by the dichroic mirror 58G, impinges upon the liquid crystal device 40G and is modulated in accordance with the image signal. The blue light L(B), which has passed through the dichroic mirror 58G, is reflected from the mirrors 58B and 60, impinges upon the liquid crystal device 40B, and is modulated in accordance with the image signal.

The red light L(R) having been modulated by the liquid crystal device 40R, the green light L(G) having been modulated by the liquid crystal device 40G, and the blue light L(B) having been modulated by the liquid crystal device 40B impinges upon the one composing prism 64 (acting as the composing optical system). The composing prism 64 has two dichroic surfaces 64a and 64b, which are located within the composing prism 64. The composing prism 64 combines the red light L(R), which has been radiated out from the liquid crystal device 40R, the green light L(G), which has been radiated out from the liquid crystal device 40G, and the blue light L(B), which has been radiated out from the liquid crystal device 40B, with one another. The thus obtained composite light is radiated out in one direction from the composing prism 64. This embodiment of the projection type display apparatus 50 is used in combination with a screen 70. The composite light, which has been radiated out from the composing prism 64, passes through a projecting lens 65 (acting as the projecting optical system) and is projected onto the screen 70 as an image having an enlarged image size.

This embodiment of the projection type display apparatus 50 is constituted in the manner described above. This embodiment of the projection type display apparatus 50 utilizes the liquid crystal devices 40R, 40G, and 40B, each of which is constituted of the aforesaid embodiment of the liquid crystal device 40. Therefore, the projection type display apparatus 50 has good displaying quality, such as the contrast and the angle of field, and exhibits good long term use stability.

This embodiment of the projection type display apparatus 50 is constituted as the projector. The projection type display apparatus in accordance with the present invention is also applicable to a rear projection type of a display apparatus, and the like.

EXAMPLES

The present invention will further be illustrated by the following non-limitative examples.

Example 1

A phase difference compensation element A1 in accordance with the present invention was produced in the manner described below. The phase difference compensation element A1 had a constitution basically identical with the constitution of the aforesaid embodiment of the phase difference compensation element 10, except that the second phase difference compensation layer 13 was constituted of only the two inorganic oblique incidence vacuum deposited films 13A and 13B and was not provided with the inorganic oblique incidence vacuum deposited films 13C and 13D. The reference wavelength $\lambda$ at the time of the calculation of the retardation value Re, and the like, was set at 435 nm.

Specifically, as the light transmissive base material 11, a glass base plate (1737 Glass, supplied by Corning Glass Works, 50 mm×50 mm) was utilized. Firstly, RAS (supplied by Synchron Co.) was utilized as a vacuum evaporation apparatus, and $TiO_2$ films and $SiO_2$ films were alternately formed on the light transmissive base material 11 with a frontal incidence sputtering technique under the conditions of the room temperature and a pressure of $5 \times 10^{-1}$ Pa. Fifty $TiO_2$ high refractive index films 12A, 12A, ... (each of which had a film thickness of 30 nm) and 50 $SiO_2$ low refractive index films 12B, 12B, ... (each of which had a film thickness of 20 nm) were thus alternately laminated, such that the total film thickness might be equal to 5 μm. In this manner, the first phase difference compensating layer 12 constituted of 100 films in total was formed. As a result of measurements performed with a spectral ellipsometer, it was confirmed that the thus obtained first phase difference compensating layer 12 had the negative birefringent characteristics, that the optical anisotropy-free optic axis in the first phase difference compensating layer 12 coincided with the line normal to the light transmissive base material 11, and that the first phase difference compensating layer 12 had the functions as a negative C-plate.

Thereafter, AAMF (supplied by Shinko Seiki K.K.) was utilized as a vacuum evaporation apparatus, and the region within the vacuum evaporation apparatus was evacuated to a vacuum of $1 \times 10^{-4}$ Pa. An oxygen gas was then introduced into the vacuum evaporation apparatus until the pressure within the vacuum evaporation apparatus became equal to $1 \times 10^{-2}$ Pa. In this state, the inorganic oblique evaporation was performed two times under the room temperature. The direction of oblique evaporation (i.e., the azimuthal angle and/or the polar angle) was altered between the two times of the inorganic oblique evaporation. In this manner, the second phase difference compensating layer 13, which was constituted of the one inorganic oblique incidence vacuum deposited film 13A (having a film thickness of 1,300 nm) and the one inorganic oblique incidence vacuum deposited film 13B (having a film thickness of 2,000 nm), was formed on the first phase difference compensating layer 12 described above. Each of the inorganic oblique incidence vacuum deposited films 13A and 13B was constituted of a mixture of $ZrO_2$ and $TiO_2$ in a mass ratio of $ZrO_2:TiO_2=90:10$. The retardation value Re(i) of the inorganic oblique incidence vacuum deposited film which had been formed at the i-th stage of film formation of the second phase difference compensating layer 13 was set such that Re(1)<Re(2).

Thereafter, the same AAMF vacuum evaporation apparatus was utilized, and the region within the vacuum evaporation apparatus was evacuated to a vacuum of $1 \times 10^{-4}$ Pa. In this state, the anti-reflection layer 14 was formed on the second phase difference compensating layer 13 described above by use of a frontal evaporation technique. The anti-reflection layer 14 had a laminate structure constituted of an $SiO_2$ film (optical film thickness: $\lambda/4$)/a $TiO_2$ film (optical film thickness: $\lambda/2$)/an $SiO_2$ film (optical film thickness: $\lambda/4$), where $\lambda$ represents the reference wavelength described above. The light transmissive base material 11 was then turned upside down and was set in the same AAMF vacuum evaporation apparatus. In this state, the anti-reflection layer 15 having the layer structure identical with the layer structure of the anti-reflection layer 14 was formed on the light radiating side surface of the light transmissive base material 11. The phase difference compensation element A1 for blue light in accordance with the present invention was produced.

Also, the reference wavelength was set at 700 nm, and a phase difference compensation element A2 for red light in accordance with the present invention was produced in the same manner as that described above. Further, the reference wavelength was set at 546 nm, and a phase difference compensation element A3 for green light in accordance with the present invention was produced in the same manner as that described above.

Comparative Example 1

For comparison, a phase difference compensation element B1 for blue light, a phase difference compensation element B2 for red light, and a phase difference compensation element B3 for green light were produced in the same manner as that in Example 1, except that the order, in which the inorganic oblique incidence vacuum deposited films 13A and 13B were formed, was altered. In Comparative Example 1, the retardation value Re(i) of the inorganic oblique incidence vacuum deposited film which had been formed at the i-th stage of film formation of the second phase difference compensation layer 13 was set such that Re(1)>Re(2).

Example 2

A phase difference compensation element C1 for blue light in accordance with the present invention, a phase difference compensation element C2 for red light in accordance with the present invention, and a phase difference compensation element C3 for green light in accordance with the present invention were produced in the same manner as that in Example 1, except that the second phase difference compensation layer 13 was formed so as to have the laminate structure constituted of the four inorganic oblique incidence vacuum deposited films 13A, 13B, 13C, and 13D. In Example 2, the retardation value Re(i) of the inorganic oblique incidence vacuum deposited film which had been formed at the i-th stage of film formation of the second phase difference compensation layer 13 was set such that Re(1)<Re(2)=Re(3)<Re(4)

Comparative Example 2

For comparison, a phase difference compensation element D1 for blue light, a phase difference compensation element D2 for red light, and a phase difference compensation element D3 for green light were produced in the same manner as that in Example 2, except that the order, in which the inorganic oblique incidence vacuum deposited films 13A, 13B, 13C, and 13D were formed, was altered. In Comparative Example 2, the retardation value Re(i) of the inorganic oblique incidence vacuum deposited film which had been formed at the i-th stage of film formation of the second phase difference compensating layer 13 was set such that Re(1)<Re(2)>Re(3)>Re(4).

(Evaluation)

<Haze Value>

With respect to each of the phase difference compensation elements for blue light, which had been obtained in Examples 1, 2 and Comparative Examples 1, 2, the haze value (%) of the entire phase difference compensation element was calculated with a procedure in accordance with JIS K7136.

(Results)

With respect to each of the phase difference compensation elements for blue light, which had been obtained in Examples 1, 2 and Comparative Examples 1, 2, the results with regard to the azimuthal angle α of the direction of oblique evaporation (as defined in FIG. 3), the polar angle β of the direction of oblique evaporation (as defined in FIG. 3), the retardation value Re of each layer, and the haze value of the entire phase difference compensation element as listed in each of Tables 1, 2, 3, and 4 shown below were obtained.

As clear from Tables 1, 2, 3, and 4, in cases where the results obtained in Example 1 and Comparative Example 1, in which the second phase difference compensating layers 13, 13 were constituted of the same number of the inorganic oblique incidence vacuum deposited films, were compared with each other, and in cases where the results obtained in Example 2 and Comparative Example 2, in which the second phase difference compensating layers 13, 13 were constituted of the same number of the inorganic oblique incidence vacuum deposited films, were compared with each other, it was confirmed that the phase difference compensation elements having been obtained in Examples 1 and 2, in which the second phase difference compensating layer 13 was formed such that the inorganic oblique incidence vacuum deposited films were laminated in the order of the increasing retardation value Re, had the advantages over the phase difference compensation elements having been obtained in Comparative Examples 1 and 2, respectively, in which the second phase difference compensating layer 13 was formed such that the inorganic oblique incidence vacuum deposited films were laminated in the order other than the order of the increasing retardation value Re, in that the occurrence of vacuum evaporation failures was suppressed, in that the haze value (representing the cloudiness) was small, and in that the optical characteristics, such as the transmittance, were good. The inventors also confirmed that the same advantages were obtained with respect to each of the phase difference compensation elements for red light and the phase difference compensation elements for green light in accordance with the present invention.

The phase difference compensation element for red light, the phase difference compensation element for green light, and the phase difference compensation element for blue light, which had been obtained in each of Examples 1 and 2, were employed in the TN mode liquid crystal devices 40R, 40G, and 40B, respectively, and the projection type display apparatus 50 illustrated in FIG. 4 was thereby constituted. In such cases, the contrast ratio of the entirely white state (i.e., the brightest state) to the entirely black state (i.e., the darkest state) was as good as 700:1. In cases where an arbitrary full color image was projected, since the blackness degree of a black area was low, the image sharpness was good, and the angle of field was good. In cases where the projection type display apparatus 50 was constituted in the same manner as that described above by use of the phase difference compensation elements having been obtained in each of Comparative Examples 1 and 2, the contrast ratio of the entirely white state (i.e., the brightest state) to the entirely black state (i.e., the darkest state) was equal to 520:1.

The contrast ratio, which was obtained with the phase difference compensation elements having been obtained in each of Comparative Examples 1 and 2, was of the conventional level (approximately 500:1). It was found that, in cases where the phase difference compensation element in accordance with the present invention was employed, the phase difference was capable of being compensated for accurately, and the liquid crystal device and the projection type display apparatus having good displaying quality, such as the contrast and the angle of field, were capable of being obtained. The liquid crystal device and the projection type display apparatus, which are provided with the inorganic phase difference compensation elements in accordance with the present invention, are advantageous over a liquid crystal device and a projection type display apparatus, which are provided with organic phase difference compensation elements, in that a high heat resistance, a highlight resistance, and good chemical stability, and the like, are capable of being obtained, and the long term use stability under severe heat and light conditions is capable of being kept good.

TABLE 1

| Phase difference compensation element A1 (Example 1) | | Direction of oblique evaporation | | | |
|---|---|---|---|---|---|
| | | Azimuthal angle α (°) | Polar angle β (°) | Re value (nm) | Haze value (%) of entire element |
| Second phase difference compensating layer 13 | 13B | −45 | 33 | Re(2) = 180 | 0.9 |
| | 13A | −137 | 45 | Re(1) = 150 | |
| First phase difference compensating layer 12 | | Frontal incidence vacuum evaporation | | Re(0) = −600 | |

Re(1) < Re(2)

TABLE 2

| Phase difference compensation element B1 (Comparative Example 1) | | Direction of oblique evaporation | | Re value (nm) | Haze value (%) of entire element |
|---|---|---|---|---|---|
| | | Azimuthal angle α (°) | Polar angle β (°) | | |
| Second phase difference compensating layer 13 | 13A | −137 | 45 | Re(2) = 150 | 1.2 |
| | 13B | −45 | 33 | Re(1) = 180 | |
| First phase difference compensating layer 12 | | Frontal incidence vacuum evaporation | | Re(0) = −600 | |

Re(1) > Re(2)

TABLE 3

| Phase difference compensation element C1 (Example 2) | | Direction of oblique evaporation | | Re value (nm) | Haze value (%) of entire element |
|---|---|---|---|---|---|
| | | Azimuthal angle α (°) | Polar angle β (°) | | |
| Second phase difference compensating layer 13 | 13D | −116 | 24 | Re(4) = 214 | 1.2 |
| | 13C | −138 | 40 | Re(3) = 104 | |
| | 13B | 22 | 24 | Re(2) = 104 | |
| | 13A | −16 | 24 | Re(1) = 72 | |
| First phase difference compensating layer 12 | | Frontal incidence vacuum evaporation | | Re(0) = −600 | |

Re(1) < Re(2) = Re(3) < Re(4)

TABLE 4

| Phase difference compensation element D1 (Comparative Example 2) | | Direction of oblique evaporation | | Re value (nm) | Haze value (%) of entire element |
|---|---|---|---|---|---|
| | | Azimuthal angle α (°) | Polar angle β (°) | | |
| Second phase difference compensating layer 13 | 13A | −16 | 24 | Re(4) = 72 | 1.7 |
| | 13B | 22 | 24 | Re(3) = 104 | |
| | 13D | −116 | 24 | Re(2) = 214 | |
| | 13C | −138 | 40 | Re(1) = 104 | |
| First phase difference compensating layer 12 | | Frontal incidence vacuum evaporation | | Re(0) = −600 | |

Re(1) < Re(2) > Re(3) > Re(4)

INDUSTRIAL APPLICABILITY

The phase difference compensation element in accordance with the present invention is capable of being utilized appropriately for liquid crystal devices, particularly liquid crystal devices for use in projection type display apparatuses.

The invention claimed is:

1. A phase difference compensation element, comprising at least one birefringent laminate, which contains a light transmissive base material and "a" number, where a≧2, of inorganic oblique incidence vacuum deposited films varying in direction of oblique evaporation, the inorganic oblique incidence vacuum deposited films having been laminated on a surface of the light transmissive base material,
the birefringent laminate satisfying the conditions represented by Formula (i) and Formula (ii):

$Re(1) < Re(a)$ (i)

$Re(b-1) \leq Re(b)$ (ii)

where b is an arbitrary integer satisfying the condition 2≦b≦a
wherein Re(i) represents the retardation value d·Δn of the inorganic oblique incidence vacuum deposited film which has been formed at an i-th stage of film formation among the stages of forming the "a" number of the inorganic oblique incidence vacuum deposited films, respectively, where 1≦i≦a, d represents the film thickness, and Δn represents the birefringent index.

2. A phase difference compensation element for use in combination with a liquid crystal cell, which is provided with a pair of base plates located so as to stand facing each other, and a liquid crystal layer supported between the pair of the base plates, the pair of the base plates being provided with electrodes for applying a voltage across the liquid crystal layer,
the phase difference compensation element comprising at least one birefringent laminate, which contains a light transmissive base material, a first phase difference compensating layer for performing phase difference compensation with respect to birefringent characteristics of liquid crystal molecules having been set in an approximately uniaxial orientated state, and a second phase difference compensating layer for performing phase difference compensation with respect to birefringent characteristics of liquid crystal molecules having been set in a hybrid orientated state, the first phase difference compensating layer and the second phase difference compensating layer having been laminated on a surface of the light transmissive base material, the second phase difference compensating layer of the birefringent laminate having a laminate structure constituted of "a" number, where a≧2, of birefringent films, the second phase difference compensating layer satisfying the conditions represented by Formula (i) and Formula (ii):

$$Re(1) < Re(a) \quad (i)$$

$$Re(b-1) \leq Re(b) \quad (ii)$$

where b is an arbitrary integer
satisfying the condition 2≦b≦a wherein Re(i) represents the retardation value d·Δn of the birefringent film which has been formed at an i-th stage of film formation among the stages of forming the "a" number of the birefringent films, respectively, where 1≦i≦a, d represents the film thickness, and Δn represents the birefringent index.

3. A phase difference compensation element as defined in claim 2 wherein the first phase difference compensating layer is constituted of an inorganic material, and the second phase difference compensating layer is constituted of "a" number of inorganic oblique incidence vacuum deposited films varying in direction of oblique evaporation.

4. A phase difference compensation element as defined in claim 3 wherein the liquid crystal cell is provided with orientating films for regulating the orientation of the liquid crystal molecules, which are contained in the liquid crystal layer, at the time free from voltage application, each of the orientating films being located on the side of one of inside surfaces of the pair of the base plates of the liquid crystal cell, an xyz coordinate system is set with respect to the orientating film of the liquid crystal cell, which orientating film is located on the side close to the phase difference compensation element when the phase difference compensation element is combined with the liquid crystal cell, the xyz coordinate system being defined by an x axis representing the orientation axis of the orientating film, a y axis representing the axis intersecting orthogonally with the x axis in a plane of the orientating film, and a z axis representing the axis, which is normal to the plane of the orientating film, each of the "a" number of the inorganic oblique incidence vacuum deposited films constituting the second phase difference compensating layer is set such that an xy direction vector of the direction of oblique evaporation has a vector orientation different from the direction of the x axis, and x and y coordinate components (Ax, Ay) of a composite vector, which has been composed from optic axis vectors of the "a" number of the inorganic oblique incidence vacuum deposited films constituting the second phase difference compensating layer, satisfy the conditions represented by Formula (iii):

$$0 \text{ nm} \leq |Ax| \leq 100 \text{ nm}, 50 \text{ nm} \leq |Ay| \leq 200 \text{ nm} \quad (iii)$$

each of the optic axis vectors of the "a" number of the inorganic oblique incidence vacuum deposited films being calculated with Formula (I):

$$P_i(x,y,z) = (Re(i) \times \cos \alpha_i \times \sin \beta_i, Re(i) \times \sin \alpha_i \times \sin \beta_i, Re(i) \times \cos \beta_i) \quad (I)$$

wherein $P_i$ represents the optic axis vector of the inorganic oblique incidence vacuum deposited film which has been formed at the i-th stage of film formation among the stages of forming the "a" number of the inorganic oblique incidence vacuum deposited films, respectively, where 1≦i≦a, $\alpha_i$ represents the azimuthal angle of the direction of oblique evaporation of the inorganic oblique incidence vacuum deposited film which has been formed at the i-th stage of film formation among the stages of forming the "a" number of the inorganic oblique incidence vacuum deposited films, respectively, and $\beta_i$ represents the polar angle of the direction of oblique evaporation of the inorganic oblique incidence vacuum deposited film which has been formed at the i-th stage of film formation among the stages of forming the "a" number of the inorganic oblique incidence vacuum deposited films, respectively, the azimuthal angle being the angle made between the xy direction vector of the direction of oblique evaporation and the x axis, the polar angle being the angle made between the xyz direction vector of the direction of oblique evaporation and the z axis.

5. A phase difference compensation element as defined in claim 4 wherein the phase difference compensation element satisfies the condition represented by Formula (iv):

$$-2 \times Re(LC) \leq Re(0) \leq -0.5 \times Re(LC) \quad (iv)$$

wherein Re(0) represents the retardation value of the first phase difference compensating layer, and Re(LC) represents the retardation value of the liquid crystal layer at the time of application of a maximum voltage.

6. A phase difference compensation element as defined in claim 2 wherein the first phase difference compensating layer has a laminate structure, in which at least one high refractive index film having a comparatively high refractive index and at least one low refractive index film having a comparatively low refractive index have been laminated alternately, and an optical film thickness of each of the high refractive index film and the low refractive index film, which optical film thickness is the product of a physical film thickness and the refractive index, falls within the range of 1/100 of a reference wavelength of light incident upon the phase difference compensation element to 1/5 of the reference wavelength of the light incident upon the phase difference compensation element.

7. A phase difference compensation element as defined in claim 1 wherein an anti-reflection layer is formed on the outermost surface on a light incidence side of the phase difference compensation element and/or the outermost surface on a light radiating side of the phase difference compensation element.

8. A phase difference compensation element as defined in claim 2 wherein an anti-reflection layer is formed on the outermost surface on a light incidence side of the phase difference compensation element and/or the outermost surface on a light radiating side of the phase difference compensation element.

9. A liquid crystal device, comprising:
a liquid crystal cell, which is provided with a pair of base plates located so as to stand facing each other, a liquid crystal layer supported between the pair of the base plates, and orientating films for regulating the orientation of liquid crystal molecules contained in the liquid crystal layer at the time free from voltage application, each of the orientating films being located on one of the pair of the base plates, the pair of the base plates being provided with electrodes for applying a voltage across the liquid crystal layer, and a phase difference compensation element as defined in claim 1, which is located so as to stand facing the liquid crystal cell.

10. A liquid crystal device, comprising:

a liquid crystal cell, which is provided with a pair of base plates located so as to stand facing each other, a liquid crystal layer supported between the pair of the base plates, and orientating films for regulating the orientation of liquid crystal molecules contained in the liquid crystal layer at the time free from voltage application, each of the orientating films being located on one of the pair of the base plates, the pair of the base plates being provided with electrodes for applying a voltage across the liquid crystal layer, and a phase difference compensation element as defined in claim 2, which is located so as to stand facing the liquid crystal cell.

11. A projection type display apparatus, comprising:

a light source, at least one light modulating device for modulating light radiated out from the light source, and a projecting optical system for projecting the light, which has been modulated by the light modulating device, the light modulating device being constituted of a liquid crystal device as defined in claim 9.

12. A projection type display apparatus, comprising:

a light source, at least one light modulating device for modulating light radiated out from the light source, and a projecting optical system for projecting the light, which has been modulated by the light modulating device, the light modulating device being constituted of a liquid crystal device as defined in claim 10.

\* \* \* \* \*